United States Patent
Chen et al.

(10) Patent No.: US 11,658,772 B2
(45) Date of Patent: *May 23, 2023

(54) ELECTRONIC DEVICE AND COMMUNICATION METHOD FOR NON-ORTHOGONAL-RESOURCE BASED MULTIPLE ACCESS

(71) Applicant: Sony Group Corporation, Tokyo (JP)

(72) Inventors: Wei Chen, Beijing (CN); Zhiyuan Lin, Beijing (CN); Xin Guo, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 73 days.

This patent is subject to a terminal disclaimer.

(21) Appl. No.: 17/229,892

(22) Filed: Apr. 14, 2021

(65) Prior Publication Data

US 2021/0234635 A1    Jul. 29, 2021

Related U.S. Application Data

(63) Continuation of application No. 16/486,502, filed as application No. PCT/CN2018/076635 on Feb. 13, 2018, now Pat. No. 11,012,188.

(30) Foreign Application Priority Data

Feb. 17, 2017    (CN) .......................... 201710085599.7

(51) Int. Cl.
*H04L 1/00*      (2006.01)
*H04J 99/00*      (2009.01)

(52) U.S. Cl.
CPC ............ *H04L 1/0071* (2013.01); *H04J 99/00* (2022.08)

(58) Field of Classification Search
None
See application file for complete search history.

(56) References Cited

U.S. PATENT DOCUMENTS 11,012,188 B2 *   5/2021   Chen ....................... H04L 27/34
2015/0312074 A1    10/2015   Zhu et al.
(Continued)

FOREIGN PATENT DOCUMENTS

CN      101394216 A      3/2009
CN      104869094 A      8/2015
(Continued)

OTHER PUBLICATIONS

Written Opinion of the International Searching Authority dated May 21, 2018, issued in corresponding PCT/CN2018/076635.
(Continued)

*Primary Examiner* — Kouroush Mohebbi
(74) *Attorney, Agent, or Firm* — Xsensus LLP

(57) ABSTRACT

The present disclosure is related to an electronic device and communication method for non-orthogonal-resource based multiple access. An electronic device on a transmitting side in a communication system comprises a processing circuitry configured to determine information on codebook for non-orthogonal-resource based multiple access over a set of transmission resources, and interleave a plurality of occupied elements of at least two codewords of the same user equipment on the set of transmission resources, so as to reduce a correlation among a plurality of user equipments during the non-orthogonal-resource based multiple access.

20 Claims, 16 Drawing Sheets

(56) References Cited

U.S. PATENT DOCUMENTS

| | | |
|---|---|---|
| 2016/0049999 A1 | 2/2016 | Taherzadeh Boroujeni et al. |
| 2018/0077685 A1 | 3/2018 | Wu et al. |
| 2018/0083746 A1* | 3/2018 | Kang ................... H04L 27/20 |
| 2019/0044571 A1 | 2/2019 | Taherzadeh Boroujeni et al. |
| 2019/0174345 A1* | 6/2019 | Xing ................ H04L 25/03898 |
| 2019/0305877 A1 | 10/2019 | Lee et al. |

FOREIGN PATENT DOCUMENTS

| | | |
|---|---|---|
| CN | 105359443 A | 2/2016 |
| CN | 105554901 A | 5/2016 |
| CN | 106374985 A | 2/2017 |
| CN | 106411456 A | 2/2017 |

OTHER PUBLICATIONS

"Interleaver based non-orthogonal multiple access", 3GPP TSG RAN WG1 #86., R1-1608943, Lisbon, Portugal, Oct. 10-14, 2016.

* cited by examiner resource allocating parameter of UE2

$$\begin{array}{c} \\ T=1 \\ \\ \\ T=2 \\ \\ \end{array} \begin{array}{c} K=1 \\ K=2 \\ K=3 \\ K=4 \\ K=1 \\ K=2 \\ K=3 \\ K=4 \end{array} \begin{pmatrix} 1 & 1 & 1 & 0 & 0 & 0 & 0 & 0 \\ 1 & 0 & 0 & 1 & 0 & 1 & 0 & 0 \\ 1 & 0 & 0 & 0 & 0 & 0 & 1 & 1 \\ 0 & 1 & 0 & 1 & 0 & 0 & 1 & 0 \\ 0 & 0 & 0 & 0 & 1 & 1 & 1 & 0 \\ 0 & 1 & 0 & 0 & 1 & 0 & 0 & 1 \\ 0 & 0 & 1 & 1 & 1 & 0 & 0 & 0 \\ 0 & 0 & 1 & 0 & 0 & 1 & 0 & 1 \end{pmatrix}$$

columns labelled: J=1 Q=1, J=2 Q=1, J=3 Q=1, J=4 Q=1, J=1 Q=2, J=2 Q=2, J=3 Q=2, J=4 Q=2

ELECTRONIC DEVICE AND COMMUNICATION METHOD FOR NON-ORTHOGONAL-RESOURCE BASED MULTIPLE ACCESS

CROSS-REFERENCE TO RELATED APPLICATIONS

The present application is a continuation of U.S. application Ser. No. 16/486,502, filed Aug. 16, 2019, which is based on PCT filing PCT/CN2018/076635, filed on Feb. 13, 2018, which claims priority of Chinese Patent Application No. 201710085599.7, filed on Feb. 17, 2017, the entire content of each are incorporated herein by reference as a portion of the application.

TECHNICAL FIELD

The present disclosure is related to an electronic device and communication method for multiple access based on non-orthogonal resources in the field of wireless communication. More particularly, the present disclosure is related to an electronic device and communication method for reducing interference between individual user equipments in non-orthogonal-resource based multiple access.

BACKGROUND ART

As technology is evolving increasingly, a variety of methods has been proposed in the communications industry to support even dense user access, even vast data traffic, and shorter delay of transmission. The multiple access technology, including frequency division multiple access, and code division multiple access, etc., is proved to be one of the indispensable technologies in wireless communication networks due to the ability to effective utilization of time-frequency resources and achievement of better access performance. Precious wireless transmission resources, however, are still very scarce, therefore the novel communication technologies are in an urgent need to enable a communication in which the non-orthogonal transmission resources are occupied between devices. As a candidate scheme for the multiple access technology in the next generation wireless communication technology, a novel non-orthogonal-resource based multiple access technology, such as Sparse Code Multiple Access (SCMA), and Pattern Division Multiple Access (PDMA), etc. has been proposed. The non-orthogonal-resource based multiple access technology is capable of achieving higher spectrum efficiency, as compared with the known Orthogonal Multiple Access (OMA) technology.

Many recent studies have demonstrated the advantages of SCMA in achieving high-rate transmission and multiple access. By designing different codebooks for different users, thereby the SCMA system can effectively distinguish signals from different users at the receiving side by a detection method, such as Message Passing Algorithm (MPA) detection. A variety of methods for effective codebook design has been proposed. For example, a strategy for a SCMA codebook design as described below is proposed by Taherzadeh et al., in "SCMA codebook design", 2014 IEEE 80th Vehicular Technology Conference (VTC2014-Fall). IEEE, 2014:1-5: dividing the SCMA codebook design into two steps consisted of a high-dimensional constellation design and a mapping matrix design, and optimizing these two steps, such that the performance of the Bit Error Rate (BER) of the SCMA system can be effectively reduced. However, the complexity of the codebook design is typically high, resulting in disadvantage of spreading.

In addition to improving system performance by way of the SCMA codebook design, it is proposed by Xiao et al. in "Iterative detection and decoding for SCMA systems with LDPC codes", Wireless Communications & Signal Processing (WCSP), 2015 International Conference on. IEEE, 2015: 1-5 that an interleaver and an LDPC encoder are introduced into the SCMA system, and an MPA detector and an LDPC decoder at the receiving side are merged, thereby improving the BER performance of the system. A cooperation of the introduced interleaver with the LDPC encoder which is a channel encoder, however, is a conventional bit-level interleaving to maximize the dispersion of the centralized errors generated abruptly during the channel transmission.

SUMMARY OF THE INVENTION

An objective of the present disclosure is to sustain the performance gain resulting from a technology of multiplexing resource of multi-access based on the non-orthogonal resource by applying a novel electronic device and communication method therein, while further reducing the correlation between signals from individual accessed user equipments by dispersing interference.

A brief outline for the present disclosure is set forth below so as to provide a substantial understanding with respect to some aspects thereof. However, it is to be appreciated that such outline is not an exhaustive one for the present disclosure. Neither it is intended to be used to identify a critical or important part of the present disclosure, nor is it intended to be used to delimit the scope thereof. The purpose of it is to present some concepts of the present disclosure in a simplified form so as to be a prelude to the description described later in more detail.

According to an aspect of the present disclosure, it is provided an electronic device on a transmitting side in a communication system. The electronic device comprises a processing circuitry which is configured to: determine information on codebook for performing a non-orthogonal-resource based multiple access over a set of transmission resources; and interleave a plurality of occupied elements of at least two codewords of the same user equipment on the set of transmission resources according to the information on codebook, so as to reduce a correlation among a plurality of user equipments during the non-orthogonal-resource based multiple access.

According to another aspect of the present disclosure, it is provided an electronic device on a receiving side in a communication system. The electronic device comprises a processing circuitry which is configured to: determine information on codebook and information on interleaving configuration for non-orthogonal-resource based multiple access for a plurality of user equipments; and detect received signals according to the information on codebook and the information on interleaving configuration to obtain data of respective user equipment.

According to another aspect of the present disclosure, it is provided a communication method. The communication method comprises: determining information on codebook for performing non-orthogonal-resource based multiple access over a set of transmission resources; and interleaving a plurality of occupied elements of at least two codewords of the same user equipment on the set of transmission resources according to said information on codebook, so as to reduce a correlation among a plurality of user equipments during the non-orthogonal-resource based multiple access.

According to another aspect of the present disclosure, it is provided a communication method. The communication method comprises: determining information on codebook and information on interleaving configuration for non-orthogonal-resource based multiple access for a plurality of user equipments; and detecting received signals based on the information on codebook and the information on interleaving configuration, to obtain data of respective user equipment.

According to another aspect of the present disclosure, it is provided an electronic device on a transmitting side in a communication system. The electronic device comprises: a constellation modulation module configured to modulate bit information on data for non-orthogonal-resource based multiple access to be performed over a set of transmission resources into a plurality of complex symbols; a resource allocation module configured to perform a resource mapping on the plurality of complex symbols according to a plurality of resource allocating parameters before obtaining a plurality of high-dimensional codewords, the plurality of resource allocating parameters indicating a plurality of resources in the set of transmission resources occupied by a user equipment; a cache module configured to cache at least two high-dimensional codewords for the same user equipment; and an interleaving unit configured to interleave a plurality of occupied elements of the at least two high-dimensional codewords of the same user equipment on the set of transmission resources, so as to reduce a correlation among a plurality of user equipments during the non-orthogonal-resource based multiple access.

According to another aspect of the present disclosure, it is provided an electronic device on a transmitting side in a communication system. The electronic device comprises: a constellation modulation module configured to modulate bit information on data for non-orthogonal-resource based multiple access to be performed over a set of transmission resources into a plurality of complex symbol; a cache module configured to cache at least two complex symbols of the same user equipment; and a resource allocation module configured to expand the set of transmission resources onto at least two time domain units to obtain an expanded set of transmission resources, and to perform a resource mapping on the at least two complex symbols according to a plurality of resource allocating parameters before obtaining at least two respective high-dimensional codewords, the plurality of resource allocating parameters indicating a plurality of resources in the expanded set of transmission resources respectively occupied by the at least two complex symbols of the user equipment, wherein the at least two complex symbols occupy different resources in the expanded set of transmission resources, so as to reduce a correlation among a plurality of user equipments during the non-orthogonal-resource based multiple access.

According to another aspect of the present disclosure, it is provided an electronic device on a receiving side in a communication system. The electronic device comprises: a determination unit configured to determine an expanded information on codebook for non-orthogonal-resource based multiple access of a plurality of user equipments, wherein the expanded information on codebook includes a plurality of resource allocating parameters on a time-domain expanded set of transmission resources; and a detecting module configured to detect a plurality of signals received on the time-domain expanded set of transmission resources according to the expanded information on codebook to obtain data of respective user equipment.

According to aspects of the present application, an optimization design performed in consideration of the information on codebook for non-orthogonal-resource based multiple access both sustains the main performance gain resulting from the technology of the non-orthogonal-resource based multiple access and further reduces the correlation among the signals of the individual access user equipments by dispersing the interference, thereby improving an overall performance of the communication system for non-orthogonal-resource based multiple access.

BRIEF DESCRIPTION OF THE DRAWINGS

The disclosure may be better understood with reference to the detailed description as described below in conjunction with the drawings, wherein the like or similar reference numerals are used throughout the drawings to indicate the like or similar elements. The accompanying drawings, along with the following detailed description, are incorporated in the specification, and form a part thereof, to exemplify the embodiments of the present disclosure and explain the principle and advantage thereof, in which.

DESCRIPTION OF EMBODIMENTS

Figure 1A:
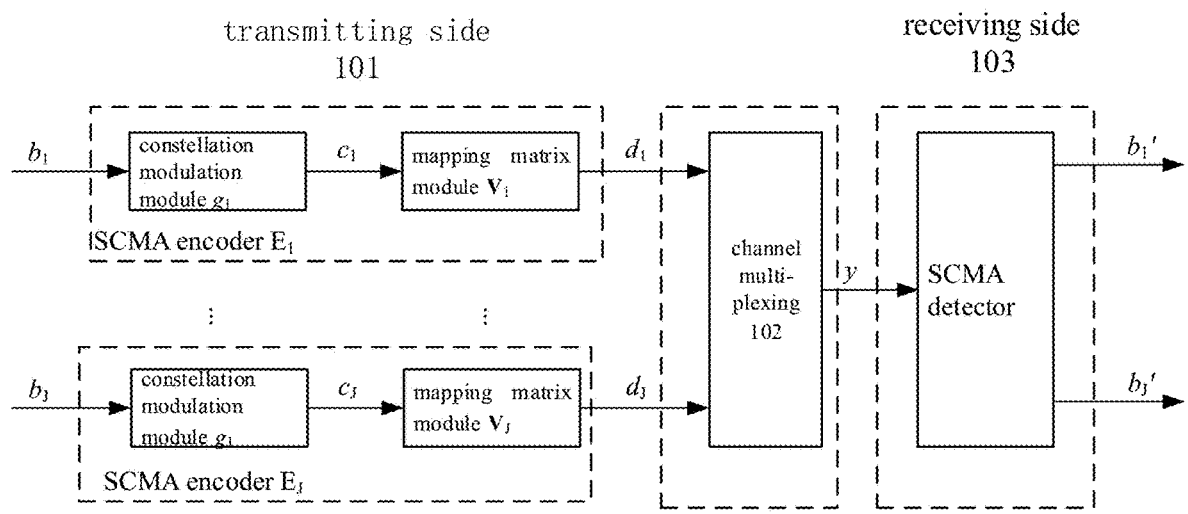
FIG. 1A is a structural block diagram illustrating a known SCMA system.

The exemplary embodiments of the present disclosure will be described hereinafter with reference to the accompanying drawings. For the sake of clarity and brevity, not all features of the embodiments are described in this specification. It should be noted, however, that many settings specific to implementations can be made in accordance with particular requirement when implementing the embodiments of the present disclosure, in order to achieve a specific goal of developer, e.g., comply with the restrictions related to the device and service, and those restrictions may vary depending on the different implementations. In addition, it should also be appreciated that although the development work may be more complicated and cumbersome, it is merely a routine task for those skilled in the art having the benefit of the content of the present disclosure.

Moreover, it should be noted that only the processing steps and/or device structures closely related to at least the technical solutions according to the present disclosure are shown in the drawings, and other details less related thereto are omitted, in order to avoid an obscuration of the present disclosure by unnecessary detail.

1. An Introduction of the Concepts

Some concepts that are useful for understanding the present disclosure are introduced below firstly.

In the present disclosure, various specific terms are used for convenience of description. It should be noted, however, that the terms used is to be interpreted in a broader sense. Although the terms used in the present disclosure have other names or definitions in different technology or application scenarios, those skilled in the art will appreciate that those are intended to be covered thereby based on the following description.

In the present disclosure, the term "codebook" is primarily used to refer to a scheme for a resource allocation designed for each user equipment in non-orthogonal-resource based multiple access, and may also indicate a scheme for a modulation in some examples. The design of the codebook is mainly realized by the control device of the communication system. The communication system designs different codebooks for different user equipments, and enables the difference of the codebooks among different user equipments to be as distinct as possible, thereby facilitating the detection on the receiving side. For example, in SCMA, the information on codebook includes information related to the mapping matrix, and also include information related to constellation operations in some examples. For example, in PDMA, the information on codebook includes information related to constellation modulation and/or pattern matrix. In other novel types of techniques of multiple access, the information on codebook may include similar information regarding resource allocation and modulation.

In the present disclosure, the term "set of transmission resources" is primarily used to refer to a set of transmission resources that provide the non-orthogonal-resource based multiple access for a plurality of user equipments. Depending on granularity of the resource allocation particularly applied to communication system, the set of transmission resources may be a set of resources for communication transmission of various levels/types, such as a set of time slots, frequency bands, subcarriers, time-frequency resource units, or time-frequency resource blocks. However, those skilled in the art will appreciate that the set of transmission resources may include additional transmission resources, such as space and code domain resources, in addition to the time and frequency domain resources. Individual user equipments may occupy at least part of the transmission resources in the same set of transmission resources, and the transmission resources occupied thereby are likely to be partially overlapped in the technology of non-orthogonal-resource based multiple access, in order to achieve an efficient utilization of the resources.

In the present disclosure, the term "resource allocating parameter" is primarily used to indicate the transmission resources occupied by individual user equipments on the set of transmission resource. For example, in SCMA, the resource allocating parameter may be embodied as a mapping matrix for individual user equipments, or an variant thereof (such as a binary indicator vector), or a factor graph matrix for a plurality of user equipments, etc., wherein "1", and "0" may be used as the occupied elements to indicate whether the data of the user equipment occupies certain transmission resource, which will be described in detail in Section 2 hereinafter. For example, in PDMA, the resource allocating parameter may be embodied as a pattern matrix or the like, wherein "1", "0" or other occupied elements may be used to express whether the data of the user equipment occupies certain transmission resource. In other novel types of technologies of multiple access, the resource allocating parameter may be embodied in other forms in a similar manner.

Channel State Information Reference Signal (CSI-RS): Channel State Information Reference Signal is a reference signal defined in the LTE protocol for a channel estimation of a downlink channel, so as to determine the resource allocating parameter, the interleaving information, and the like. CSI-RS is exemplified as below, but it should be understood that if there are other reference signals available for a channel estimation of downlink channel, those reference signals can also be used, and reference signals are not limited to CSI-RS.

Sounding Reference Signal (SRS): Sounding Reference Signal is a reference signal that has been defined in the LTE protocol, and is primarily used for a channel estimation of an uplink channel in order to determine the resource allocating parameter, the interleaving information, and the like. SRS is exemplified as below, but it should be understood that if there are other reference signals available for a channel estimation of an uplink, those reference signals can also be used, and reference signals are not limited to SRS.

Control device: the control device described in the specification can be implemented as any type of eNB, or other types of base station, etc. (for a description of the base station, see "an application example for the control device" as described later), and the control device is sometimes referred to as a base station hereinafter.

User Equipment (UE): the user equipment described in the specification of the present disclosure may be implemented as a mobile terminal, or an in-vehicle terminal, etc. (see "an application example for the user equipment" as described later), and the user equipment is sometimes simply referred to as a UE.

Performance gain: the performance gain of a system for non-orthogonal-resource based multiple access is primarily originated from a complex codebook design thereof. By virtue of the codebook design, the codebook difference among different users can be made as distinct as possible, from which a nonlinear multi-user detection on the receiving side, such as the Message Passing Algorithm (MPA) detection, or the Serial Interference Cancellation (SIC) detection, can be benefitted thereby. A more detailed description of the examples can be seen in Section 3-3 as below.

In the following description, many symbols are used. For convenience of understanding, the symbols used as below are organized as follows.

TABLE 1

List of Symbols

| | | | |
|---|---|---|---|
| J | number of User Equipments | K | dimension of codeword |
| N | number of non-zero dimensions in codeword | M | modulation order, i.e., number of constellation points |
| Q | number of codewords/symbols subjected to interleaving | | |
| $b_j$ | bit information on user equipment j, $b_j \in \mathbb{B}^{\log M}$ | $c_j$ | N-dimensional complex symbol of user equipment j, $c_j \in \mathbb{C}^N$ |
| $d_j$ | K-dimensional codeword of user equipment j, $d_j \in \mathbb{C}^K$ | $e_j$ | QN-dimensional complex joint symbol of user equipment j, $e_j \in \mathbb{C}^{QK}$ |
| $x_j$ | QK-dimensional joint codeword of user equipment j, $x_j \in \mathbb{C}^{QK}$ | $h_j$ | channel state of user equipment j |
| $\pi_j$ | interleaver of user equipment j, the length thereof is QK in the 1st type of I-SCMA, , and is QN in the 2nd type of I-SCMA | | |

For convenience of understanding, various aspects, embodiments, and examples of the present disclosure will be described in detail hereinafter by taking SCMA as an example. However, it does not mean that the present disclosure is merely or preferably adapted to SCMA technology. After reading the present disclosure, those skilled in the art will appreciate that the present disclosure may also be adapted to other techniques of non-orthogonal-resource based multiple access, such as PDMA.

2. Known SCMA System

Firstly, a block diagram of a known SCMA system will be introduced, and the electronic device and method of the present disclosure will be understood more clearly after a comparison therewith.

FIG. 1A is the block diagram illustrating the known SCMA system. As shown in FIG. 1A, the known SCMA system includes three portions: a transmitting side portion 101, a channel multiplexing portion 102 (which is an air channel in practice), and a receiving side portion 103. The transmitting side portion 101 includes SCMA encoders $E_1 \sim E_J$ and the like for each user equipment. The receiving side portion 103 includes an SCMA detector.

The SCMA encoder is configured to SCMA encode the data of the user equipment by utilizing a codebook designed for the user equipment. The codebooks used by different user equipments are different from each other, and the codebooks of different user equipments are designed to have as distinct a difference as possible, in order to facilitate the detection on the receiving side. The codebook of each user equipment contains features regarding the modulation scheme and features regarding the resource allocation. Accordingly, the SCMA encoder includes a constellation modulation module and a mapping matrix module.

Assuming that there are data of J user equipments to be transmitted through the SCMA system. On the transmitting side 101 (for example, a control device, such as a base station, or a user equipment), the bit information on the J user equipments are SCMA encoded by respective SCMA encoders. In particular, for the jth user equipment (j∈1, . . . , J), firstly, in the constellation modulation module $g_j$, the bit information $b_j \in \mathbb{B}^{\log M}$ is modulated into a complex symbol $c_j$ with a low-dimension (N dimensions). Then, in the mapping matrix module $V_j$, the N-dimensional complex symbol $c_j$ is mapped into a complex codeword $d_j$ with a high-dimension (K dimensions). Because N<K, the K-dimensional complex codeword $d_j$ is sparse, that is, only N dimensions in the K dimensions of the complex codeword $d_j$ are non-zero elements. The above SCMA encoding process is performed on the transmitting side. In the case of the uplink transmission, the transmitting side may be individual user equipments, and the SCMA encoders is included in the transmitters of individual user equipments, and accordingly, the receiving side may be a control device (for example, a base station). In the case of the downlink transmission, the transmitting side may be a control device (for example, a base station), and the SCMA encoder is included in the control device, and accordingly, the receiving side is individual user equipments.

Then, in the channel multiplexing portion 102, the K-dimensional complex codewords $d_1, \ldots, d_J$ of the J user equipments are transmitted through the same set of transmission resources (for example, including K transmission resource units), and are overlapped into an overlapped signal after a multiplexing by the air channel. The overlapped signal is received on the receiving side. For example, in the case of the uplink transmission, the control device (for example, the base station) receives the overlapped signals $$y = \sum_{j=1}^{J} h_j d_j + n,$$

and in the case of the downlink transmission, the jth user equipment receives the overlapped signal $$y_j = h_j \sum_{j=1}^{J} d_j + n,$$

where n is the received noise. The SCMA detector of the receiving side 103 detects the received overlapped signal. The SCMA detector is a multi-user detector, which is typically implemented as an MPA detector, which detects bit information $b'_1, \ldots, b'_J$ on the J user equipments from the overlapped signals based on a priori information, such as information on codebook and channel state, etc. In some alternative examples, the SCMA detector is implemented as a SIC detector. The known SCMA is a system for single codeword transmission and detection, and is a short spreading-based system.

As a technology of the non-orthogonal-resource based multiple access, although individual transmission resources (e.g., subcarriers) in the set of transmission resources of SCMA are orthogonal without any interference with each other, they are shared by plurality of user equipments rather than allocated only to one user equipment. That is, for at least part of the transmission resources (for example, subcarriers), there is a non-orthogonal transmission among different user equipments, that is, transmission resources occupied by different user equipments overlap with each other, thereby resulting in interference between user equipments. Such interference may affect the detection accuracy of the receiving side. This effect is explained in detail below by way of example.

Generally, the occupancy condition of the user equipment on the transmission resource is determined by the resource allocating parameter. In SCMA, the resource allocating parameter may be a mapping matrix V for a single user equipment. For convenience of description below, it is assumed that J=4, K=4, and N=3. For example, the mapping matrix $V_1$ for the user equipment UE1 may be:

$$V_1 = \begin{pmatrix} 1 & 0 & 0 \\ 0 & 1 & 0 \\ 0 & 0 & 1 \\ 0 & 0 & 0 \end{pmatrix}$$

The rows in the mapping matrix $V_1$ represent transmission resources (e.g., subcarriers) in the set of transmission resources, the number of which is K=4, and the columns therein represent the dimensions of the high-dimensional complex symbols subjected to the constellation-modulation, the number of which is N=3, where the non-zero elements in the mapping matrix $V_1$ represent an occupancy of the transmission resource by the user equipment. For example, for the user equipment UE1, the elements in the 1st, 2nd, and 3rd dimensions of the N-dimensional complex symbol will be allocated respectively to a 1st, 2nd, and 3rd transmission resources in the set of transmission resources. A K-dimensional (4-dimensional in this example) codeword is obtained after the N-dimensional complex symbol is subjected to mapping by the mapping matrix $V_1$ as described above, wherein the elements in the 4th dimension of such codeword are zeros.

The resource allocating parameter may also be a variant of the mapping matrix, for example, may be a binary indicator vector $f_j = \text{diag}(V_j V_j^T)$, thereby representing the transmission resources occupied by the user equipment over the set of transmission resources in a more intuitive manner. For example, accordingly, the binary indicator vector fl of the user equipment UE1 may be:

$$f_1 = \begin{pmatrix} 1 \\ 1 \\ 1 \\ 0 \end{pmatrix}$$

Preferably, the resource allocating parameter may be, for example, a factor graph matrix F=(f1, ..., fJ) for a plurality (J, for example) of user equipments, which are consisted of columns which are binary indicator vectors $f_j$ of the individual user equipments. For example, the factor graph matrix F of such J (J=4) user equipments can be:

$$F = \begin{pmatrix} 1 & 1 & 1 & 0 \\ 1 & 1 & 0 & 1 \\ 1 & 0 & 1 & 1 \\ 0 & 1 & 1 & 1 \end{pmatrix}$$

Each column in the factor graph matrix F represents one user equipment, and each row represents one dimension corresponding to a transmission resource module, for example, one dimension can be regarded as one subcarrier. As shown in the mapping matrix F, the user equipment UE1 occupies the 1st, 2nd, and 3rd dimensions, the user equipment UE2 occupies the 1st, 2nd, and 4th dimensions, the user equipment UE3 occupies the 1st, 3rd, and 4th dimensions, and the user equipment UE4 occupies the 2nd, 3rd, and 4th dimensions.

Figure 1B:
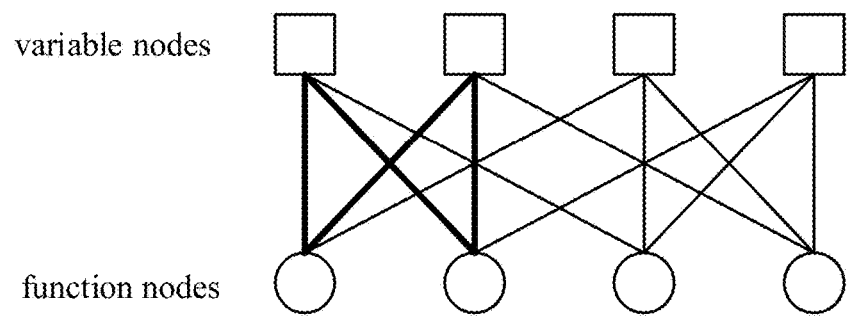
FIG. 1B is a diagram illustrating a receiver factor graph of the known SCMA system.

FIG. 1B shows an example of a receiver factor graph of an SCMA system. In the factor graph, a square represents a variable node, and a circle represents a function node. The factor graph matrix F as described above embodies the connection relationship between the variable node and the function node. As can be seen from the factor graph shown in FIG. 1B, such a factor graph matrix would result in a 4-side-circle structure as drawn by the bold lines (it is to be noted that although only a bold line is used to draw a 4-side-circle structure in FIG. 1B, there actually are a plurality of 4-side-circle structures). In general, the 4-side-circle structure is believed to reduce the accuracy of the MPA detection, thereby resulting in degradation of the BER performance of the system.

It can be recognized that if the overlapping dimension between any two columns in the factor graph matrix F is greater than 1, the 4-side-circle structure will appear. The known SCMA codebook design failed to solve this problem well, because the design of the factor graph matrix at present is already optimal.

Furthermore, in addition to the SCMA, in other non-orthogonal-resource based multiple access, such as PDMA, there may also be a situation in which the detection performance of the receiving side deteriorates due to excessive overlapping of transmission resources occupied by different user equipments. Therefore, there is a need to improve the existing system of non-orthogonal-resource based multiple access to improve system performance while sustaining the inherent performance gain as much as possible.

To this end, it is proposed in the present disclosure that an improved solution for a known system of non-orthogonal-resource based multiple access, particularly for a transmitter and a receiver thereof. Hereinafter, embodiments of the present disclosure are described in detail by taking SCMA as an example.

3. First Embodiment of the Present Disclosure

Figure 2:
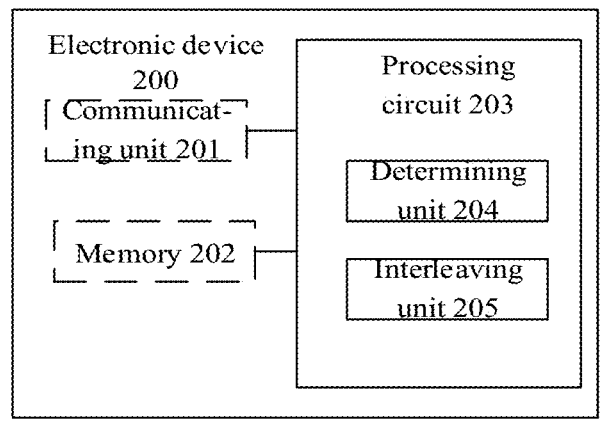
FIG. 2 is a block diagram illustrating an electronic device of a transmitting side according to a first embodiment of the present disclosure.

3-1. Electronic Device on Transmitting Side According to the First Embodiment An electronic device on the transmitting side according to the first embodiment is described below with reference to FIG. 2. FIG. 2 is a block diagram illustrating the electronic device 200 on the transmitting side according to the present embodiment.

As shown in FIG. 2, the electronic device 200 can include a communication unit 201, a memory 202, and a processing circuit 203.

The communication unit 201 can be configured to communicate with the electronic device 300 on the receiving side, which will be described below, under the control of the processor circuit 203. The communication unit 201 can be implemented as a transmitter or a transceiver. In one instance, the communication unit 201 can be implemented as a communication interface component, such as an antenna device and a radio frequency circuit. The communication unit 201 is depicted by a dashed line because it can also be located internal to the processing circuit 203 or external to the electronic device 200.

The memory 202 can store information generated by the processing circuit 203, programs and data for operation of the electronic device 200, and data and information to be transmitted by the communication unit 201. The memory 202 is depicted by a dashed line because it can also be located internal to the processing circuitry 204 or external to electronic device 200. The memory 202 can be a volatile memory and/or a non-volatile memory. For example, the memory 202 can include, but is not limited to, a Random Access Memory (RAM), a Dynamic Random Access Memory (DRAM), a Static Random Access Memory (SRAM), a Read-Only Memory (ROM), and a flash memory.

The processing circuitry 203 of the electronic device 200 can provide various physical layer functions of the electronic device 200. For example, the processing circuit 203 can include a determination unit 204 and an interleaving unit 205.

The determination unit 204 can be configured to determine information on codebook for performing SCMA over the set of transmission resources. As mentioned above, the SCMA information on codebook may include information on resource allocation and/or information on constellation. The information on resource allocation is information about a transmission resource allocated by the system for data transmission of the user equipment, for example, it may be information about a mapping matrix or a binary indicator vector designed for individual user equipment, or may be information about the factor graph matrix designed for a plurality of user equipments participating in SCMA, as described in the introduction of concepts in section 1 above.

The information on constellation is information about the modulation scheme designed for the data transmission of the user equipment. In one example, the information on constellation may include information about the mother constellation and information about the constellation operation. In one example, the constellation is determined based on a first determination of the mother constellation and a successive determination the constellation operation. The mother constellation is common for a plurality of user equipments, with the difference that different user equipments have different constellation operations for the mother constellation, where the constellation operations may be, for example, a phase rotation, a dimension permutation, a constellation conjugate, or a combination thereof.

Typically, the SCMA codebook is designed or selected by the control device. For example, the control device can design the codebook by which the plurality of user equipments may perform SCMA based on the number, the modulation mode, the number of desired resources, the number of available resources, and the like, of currently accessed user equipments. The SCMA codebooks can be dynamically designed, or they can also be pre-designed and selected therefrom for usage depending on actual scenario. From a perspective of the design flow, the mapping matrix is generally designed firstly, the resources are allocated to different user equipments, and then the N-dimensional constellation is designed based on the mapping matrix. Of course, it is also possible to perform a joint design for both of them. In general, a complexity of the joint design is much higher than that of a sequential design.

In one example, when the electronic device 200 is implemented as the control device, the information on codebook can be determined as a result of an operation by which the control device performs the codebook design and the codebook allocation. In one example, the codebook design and the codebook allocation may be performed by the processing circuitry 203 of electronic device 200, and the information on codebook for plurality of user equipments may be obtained directly by processing circuitry 203, e.g., determination unit 204. In an alternative example, the codebook design and the codebook allocation may be performed by other components, and the information on codebook may be input to the determination unit 204 of the processing circuit 203.

In another example, when the electronic device 200 is implemented as a user equipment, the determination unit 204 of the electronic device 200 obtains the information on codebook transmitted from the control device through the communication unit 201, and the information on codebook may be associated merely with the user equipment.

The interleaving unit 205 of the electronic device 200 may be configured to interleave non-zero elements of a predetermined number $Q(\geq 2)$ of codewords for the same user equipment according to the information on codebook determined by the determination unit 205, so as to further reduce the correlation among the plurality of user equipments during SCMA. In the case where each row of the factor graph matrix represents one subcarrier, the interleaved codewords (QK-dimensional codewords) are transmitted by the electronic device 200 through the communication unit 201 in Q time domain units (e.g., SCMA symbols or time slots).

The interleaving unit 205 preferably performs a specific interleaving operation, and although the interleaving operation can be performed only for the purpose of dispersing the interference, such that the performance improvement is achieved, the gain resulting from the difference among the SCMA codebooks is not necessarily superimposed therewith to produce an optimal effect. Therefore, it is more desirable that the interleaving unit 205 can sustain the inherent difference among the codebooks of the SCMA system while reducing the correlation during SCMA.

3-2. Communication Method According to the First Embodiment

Figure 3:
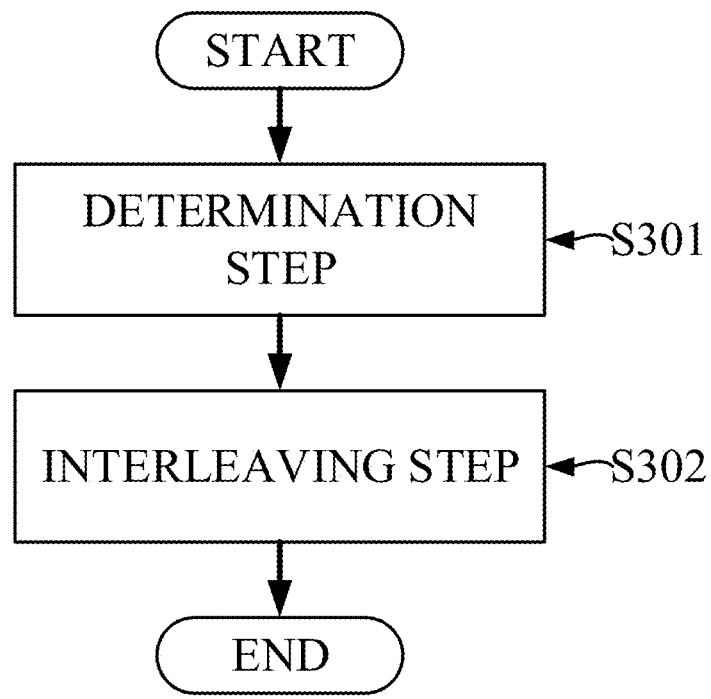
FIG. 3 is a flowchart illustrating a communication method according to the first embodiment of the present disclosure.

FIG. 3 illustrates the flowchart of the communication method for a transmitting side of a wireless communication system according to the embodiment of the present disclosure. That communication method can be used, for example, for the electronic device 200 as shown in FIG. 2.

As shown in FIG. 3, in step S301, information on codebook for performing non-orthogonal-resource based multiple access over the set of transmission resources is determined. That step can be performed by the processing circuitry, in particular, the determination unit 204, of the electronic device 200 depicted in FIG. 2.

In step S302, the occupied elements of at least two codewords of the same user equipment on the set of transmission resources are interleaved according to the information on codebook, so as to reduce the correlation among a plurality of user equipments during the non-orthogonal-resource based multiple access. That step can be performed by the processing circuitry, in particular, the interleaving unit 205, of the electronic device 200 depicted in FIG. 2. Similarly, it is desirable that the interleaving operation performed in the interleaving step S302 can sustain the main difference among the codebooks of the known SCMA while reducing the correlation during SCMA.

3-3. Conditions or Criteria to which the Interleaving Operation is Required to Conform The conditions or criteria to which the interleaving operation performed by the interleaving unit 205 in step S302 is required to conform will be discussed in detail below.

Upon designing the interleaving operation, the gain of the SCMA codebook design is analyzed, and the gain source of the SCMA codebook design is clarified such that the designed interleaving operation should sustain with best effort the features of the SCMA codebooks which bring about gain, and further improve the system performance based thereon by dispersing the interference.

The performance gain of the SCMA system is substantially originated from a complicated codebook design thereof. Through the codebook design, the codebook difference between different users can be made as distinct as possible, so as to be beneficial to a multi-user detection on the receiving side. As described above, a known process of the SCMA codebook design can generally be divided into two parts: the constellation design and the mapping matrix (the factor graph matrix in regard to a plurality of user equipments) design. The mapping matrix design represents a process by which the transmission resources (indicated by non-zero elements) are allocated to the user equipments. When different user equipments occupy the same transmission resource, that is, there are overlapped non-zero dimensions between the columns in the factor graph matrix, the constellation operation is required to be performed at that moment to provide pseudo-orthogonality between the users, thereby separating the overlapped user equipments from each other.

The constellation design can be further consisted of two parts of the mother constellation design and the constellation operation. By performing different constellation operations based on the same mother constellation, different constellations can be generated for use with different user equipments. Data information on different users after the modulations by different constellations can be distinguished and separated from each other on the receiving side.

Figure 4A:
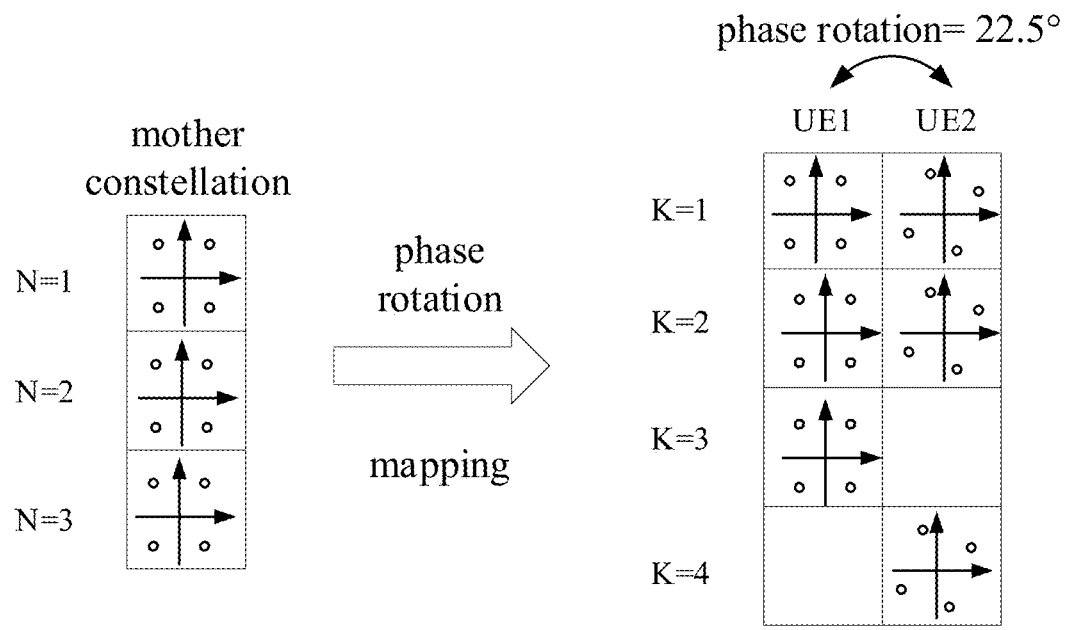
FIG. 4A is a diagram illustrating an SCMA codebook design 1.
Figure 4B:
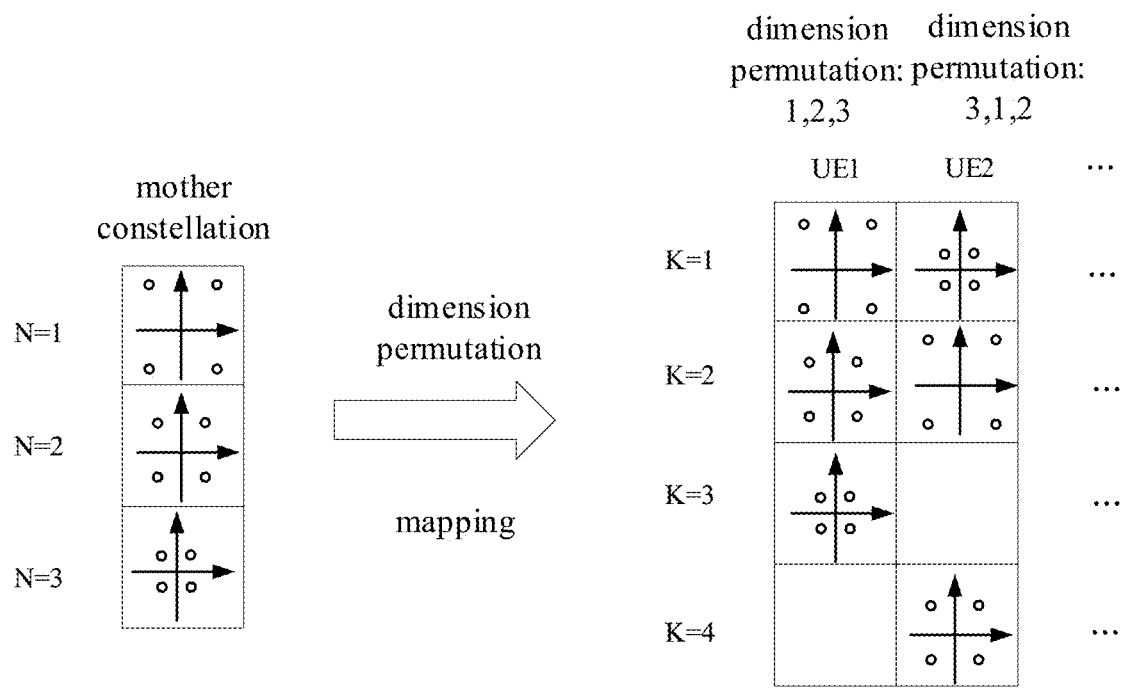
FIG. 4B is a diagram illustrating an SCMA codebook design 2.

Each modulation mode corresponds to one mother constellation of which the example may be with reference to the left portion of FIGS. 4A and 4B. The modulation mode may typically be Quadrature Amplitude Modulation (QAM), such as 4QAM, 16QAM, and the like. However, the modulation mode can also be other types of modulation modes, such as QPSK, and the like.

The constellation operation generally includes the following: a phase rotation, a constellation conjugation, and a dimension permutation. The constellation operation is not limited thereto, and includes other suitable constellation operations. An operation of the phase rotation is an operation by which the constellations for individual users are rotated with respect to the mother constellation. An operation of the constellation conjugation is an operation by which a constellation that is symmetric with respect to the real axis of the mother constellation is constructed. An operation of the dimension permutation is used principally for the case where the power difference in different dimensions of the mother constellation is high. By performing different permutations on the dimensions of the mother constellation, the usage of the component of the same dimension of the mother constellation by different user equipments in the same dimension can be avoided, thereby enabling the power difference between different user equipments in the same dimension to be as distinct as possible.

In the case where the SCMA codebooks are different from each other, the interleaving operation performed by the interleaving unit 205 may be different, thus it is required to design the interleaving operation based on the SCMA information on codebook.

Two frequent methods for designing the SCMA codebook, which are referred to as a codebook design 1 and a codebook design 2 respectively, are taken as examples herein, for example:

The codebook design 1: the mapping matrix of each user equipment is designed by minimizing the number of overlapped dimensions between the user equipments; the mother constellation is consisted of the same QAMs in N dimensions; the constellations of different user equipments are differentiated by the phase rotation, and the angle difference due to phase rotation for the constellation is 90°/J degree. An example of the codebook design 1 is shown in FIG. 4A;

The codebook design 2: the mapping matrix of each user equipment is designed by minimizing the number of overlapped dimensions between user equipments; the mother constellation is consisted of QAMs with different powers in N dimensions; the constellations of different user equipments are differentiated by the dimension permutation. An example of the codebook design 2 is shown in FIG. 4B. The dimension permutation means that the sequences in which the dimensions of the mother constellation is used by different users are different from each other. As shown in FIG. 4B, the powers of the mother constellation in different dimensions are different from each other, the power of the constellation in the dimension 1 is greater than that in the dimension 2, and the power of the constellation in the dimension 2 is greater than that in the dimension 3. The 1st user equipment uses the mother constellation in a sequence of dimensions (1, 2, 3), and the 2nd user equipment uses the mother constellation in a sequence of dimensions (3, 1, 2). The dimension permutation can enable the difference between the powers of the constellation used by different user equipments to be as distinct as possible in the overlapped dimension, so that the receiving side can distinguish different user equipments from each other.

By analyzing the codebook design 1, it can be realized that the codebook gain is substantially originated from the characteristics of the non-zero dimension occupied by different user equipments and the phase rotation angle of different user equipments. The former defines the overlapped dimensions between user equipments, which can be represented intuitively by the factor graph matrix; the latter defines the difference between the constellations of the user equipments in the overlapped dimension. The interleaving operation can sustain the substantial gain of the SCMA codebook by sustaining the two features of the codebook as described above. After the interleaving is added, the overlapped dimensions between the user equipments and the angle difference due to the rotation of constellation therein are not changed.

For a codebook design, such as the codebook design 1, it is proposed an interleaving criterion 1 to which the interleaving operation is required to conform: the interleaving operation only occurs in the non-zero dimension of the same user equipment.

Figure 5A:
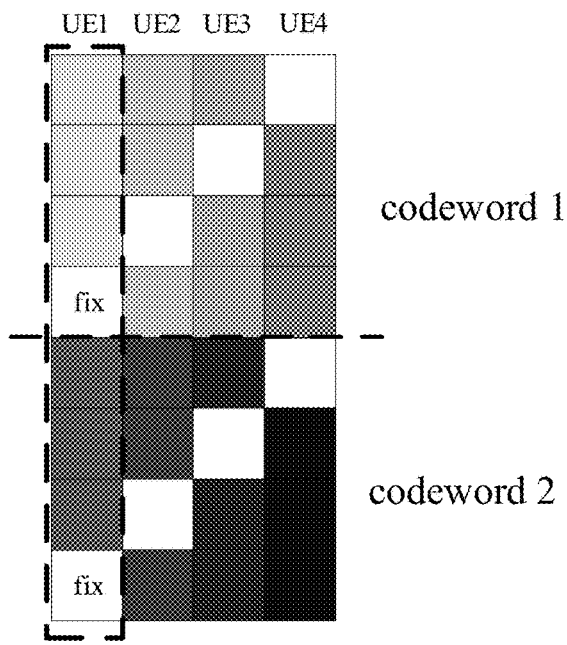
FIG. 5A is a diagram illustrating an interleaving operation based on an interleaving criterion 1 employed in the case of the SCMA codebook design 1 according to the first embodiment of the present disclosure.

FIG. 5A illustrates the example of the interleaving operation based on interleaving criterion 1 in which the interleaving operation is performed only on the elements (the occupied elements) in the non-zero dimensions of the plurality of codewords of the same user equipment in accordance with the present disclosure. As shown in FIG. 5A. After performing the interleaving operation based on the interleaving criterion 1, the difference of the constellation rotation angle in the overlapped dimension of different user equipments is not changed, and remains still in 90°/J degrees. At the same time, such interleaving operation does not change the transmission resources occupied by individual user equipments, that is, the non-zero dimensions occupied by individual user equipments are not changed. Therefore, that interleaving operation can sustain the substantial gain of the SCMA codebook design 1.

By analyzing the codebook design 2, it can be realized that the codebook gain is substantially originated from the two characteristics of the non-zero dimension occupied by the user equipment and the dimension permutation by the user equipment. The former defines the overlapped dimensions between the user equipments, which can be represented intuitively by the factor graph matrix; and the latter defines the difference between the constellations in the overlapped dimension, which can be reflected by different powers.

Figure 5B:
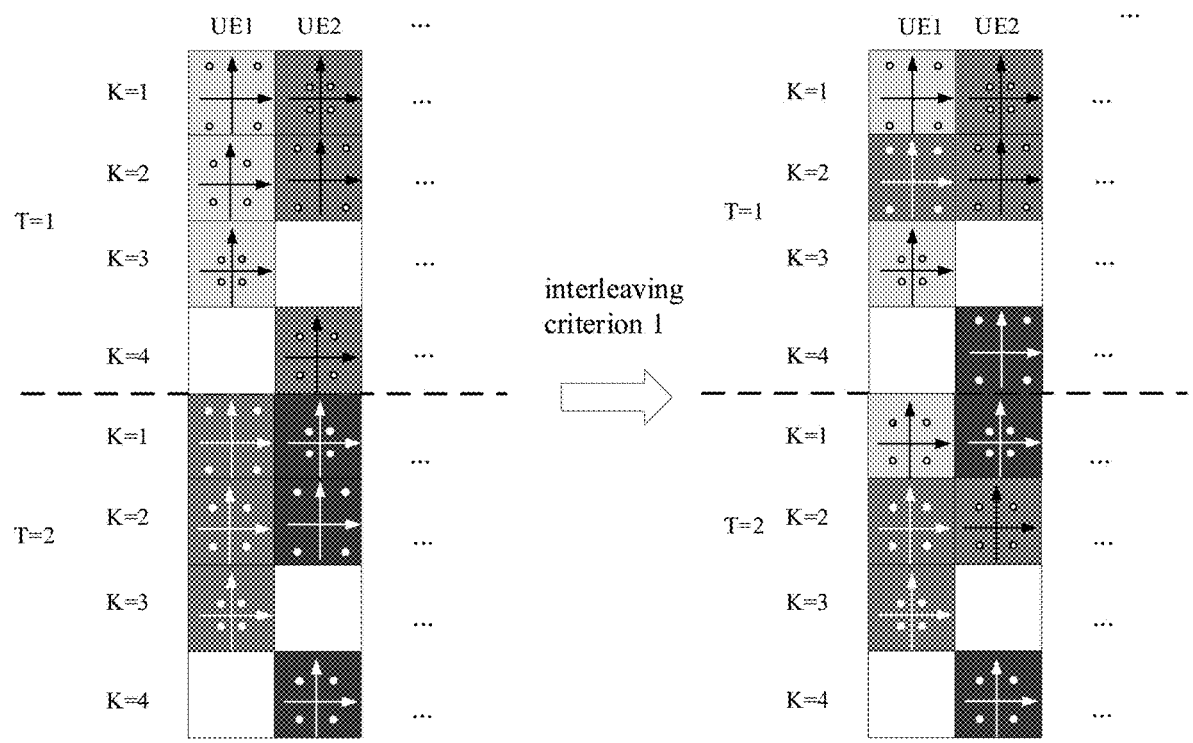
FIG. 5B is a diagram illustrating the interleaving operation based on the interleaving criterion 1 employed in the case of the SCMA codebook design 2.

For a codebook design such as the codebook design 2, if only the interleaving criterion 1 described above is conformed, i.e., the interleaving operation occurs in all non-zero dimensions of different codewords of the same user equipment, it is possible to cause the power difference between different user equipments in the overlapped dimension to be changed. FIG. 5B shows an example in which only the interleaving criterion 1 is conformed in the case of the codebook design 2, as shown in FIG. 5B, after the interleaving operation, the user equipments UE 1 and UE 2 uses the constellation with the same power in the overlapped dimension (the 2nd dimension), which is unfavorable for the receiving side to distinguish the user equipments.

In that case, the interleaving operation is required to conform to the interleaving criterion 2 which is stricter: the interleaving operation only occurs in the same non-zero dimension of the same user equipment.

Figure 5C:
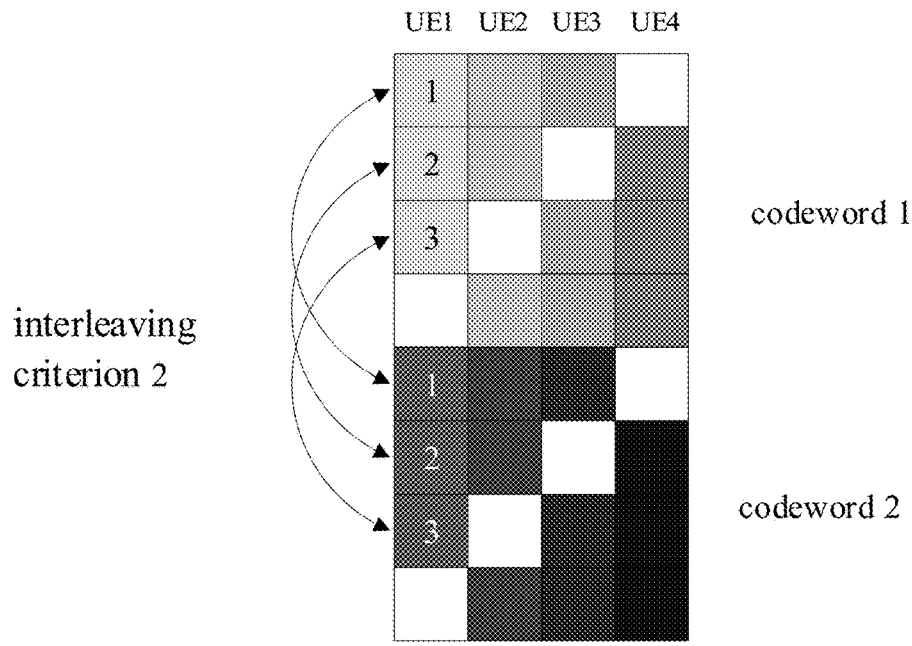
FIG. 5C is a diagram illustrating an interleaving operation based on an interleaving criterion 2 employed in the case of the SCMA codebook design 2 according to the first embodiment of the present disclosure.

FIG. 5C illustrates an example of the interleaving operation based on the interleaving criterion 2 in which the interleaving operation is performed only on the elements (the occupied elements) in non-zero dimensions of the plurality of codewords of the same user equipment, in accordance with the present disclosure. In FIG. 5C, the user equipment UE1 is taken as an example, the elements in the 1st dimension in the codeword 1 are exchanged with only those in the 1st dimension in the codeword 2 (because there are only two codewords, the interleaving may be deemed as the exchange, and if Q>2 codewords are interleaved, the position adjustment in the same dimension of the Q codewords should be performed), and the elements in the 2nd dimension in the codeword 1 are exchanged with only those in the 2nd dimension in the codeword 2, and so on.

It can be seen that the interleaving operation based on the interleaving criterion 2 can keep the overlapped dimension between the individual user equipments unchanged. At the same time, since the constellation powers of the same dimension of different codewords are identical to each other, an exchange of the elements in the same dimension of different codewords does not change the constellation power, thus the power difference of different user equipments in the overlapped dimension is not changed either. Therefore, such interleaving method can sustain the substantial gain of the SCMA codebook design 2.

It should be noted that the interleaving criterion 2 is also adapted to the SCMA codebook design 1. That is, the interleaving operation based on the interleaving criterion 2 is able to be adapted to a more general codebook design. In addition, it can be understood that the SCMA codebook designs 1 and 2 are possible to be superimposed together for application, for example, a differentiation is performed by a further phase rotation of the constellations of different user equipments based on the SCMA codebook design 2, and then the utilization of the interleaving criterion 2 can sustain the difference between SCMA codebooks.

The principal criteria in accordance with which the type of interleaving operation should be performed by the interleaving unit 205 of the electronic device 200 are described above. Although the interleaving criteria 1 and 2 are proposed by analyzing the codebook design 1 using the phase rotation and the codebook design 2 using the dimension permutation, it should be noted that it does not mean that the application range of the interleaving criteria 1 and 2 is limited thereto, and the interleaving criteria can be appropriately selected based on the information on the codebook designed in other manners. The specific interleaver design and interleaving operation can be seen in the implementation examples of the following sections 4-5. For example, based on the codebook design 1, a more complicated design for the SCMA codebook can be performed, in which the constellations in different dimensions of the same user equipment are further differentiated by utilizing the phase rotation, and the difference of the phase rotation angle of the constellations in the different dimensions is 90°/N degrees. Similarly, the interleaving criterion 2 can also be applied.

Figure 5D:
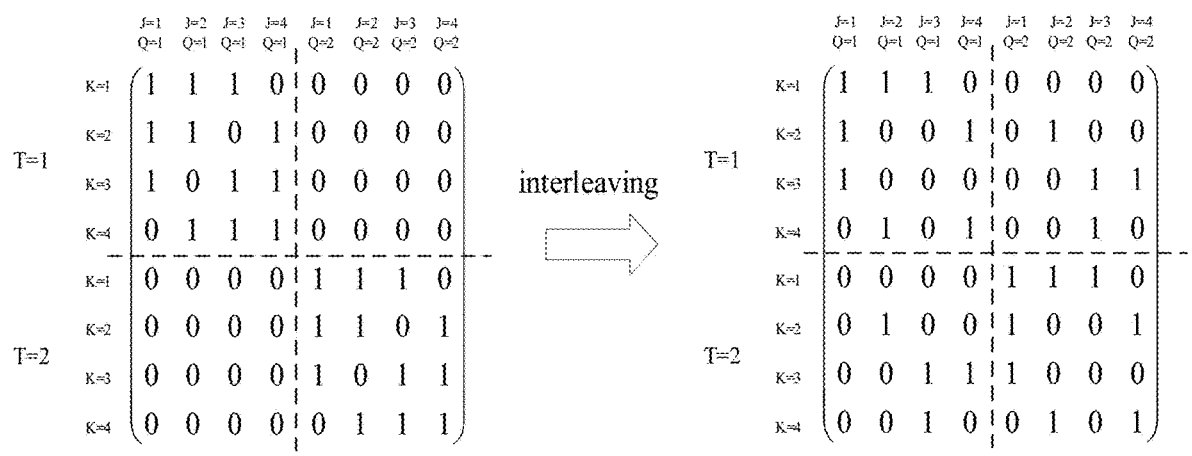
FIG. 5D is a diagram illustrating a joint factor graph matrix according to the first embodiment of the present disclosure.

FIG. 5D illustrates the effects due to the interleaving operation in accordance with an embodiment of the present disclosure. The left in FIG. 5D shows an example of a joint factor graph matrix without interleaving, and the right in FIG. 5D shows an example of the joint factor graph matrix with interleaving. The joint factor graph matrix is generated according to the factor graph matrix F exemplified above. The rows of the joint factor graph matrix represent QJ codewords of J users, and the columns represent QK transmission resources occupied by Q codewords, which can be considered as an extended resource allocating parameter in some cases.

Considering the case where Q=2 codewords are transmitted in two time domain units, such as time slots. Where T=1 represents the 1st time slot, T=2 represents the 2nd time slot; J=1, 2, 3, 4 represents an identification number of the user; Q=1 represents the codeword 1, and Q=2 represents the codeword 2; the elements in the matrix reflect the occupancy of the sparse codewords of individual users in the dimension of the transmission resource unit, the transmission time slot, and the like.

As shown in FIG. 5D, the matrix on the left represents a joint factor graph matrix corresponding to the known SCMA system. The upper left and lower right sub-matrices divided by the broken line are the factor graph matrix F as mentioned above. The codeword 1, in the upper left part, of J=4 user equipments is transmitted in the 1st time slot, and the codeword 2, in the lower right part, is transmitted in the 2nd time slot.

The upper half and the lower half in the joint factor graph matrix on the right side represent respectively the codewords to be transmitted in the 1st (T=1) and 2nd (T=2) time slots. For example, as shown in the 1st and 5th columns of the joint factor graph matrix, for the 1st user equipment, all components of the codewords 1 and 2 are transmitted respectively in the 1st and 2 time slots. This is because that, as shown in FIG. 5D, no interleaving occurs between the codewords 1 and 2 of the 1st user. As shown in the 2nd and 6th columns of the joint factor graph matrix, for the 2nd user equipment, the elements in the 1st and 4th dimensions of the codeword 1 and the elements in the 2nd dimension of the codeword 2 are transmitted in the 1st time slot, and the elements in the 2nd dimension of the codeword 1 and the elements in the 1st and 4th dimensions of the codeword 2 are transmitted in the 2nd time slot. Other user equipments are similar thereto.

In particular, the interleaving operation in FIG. 5D is based on the interleaving criterion 2, i.e., it only occurs in the same non-zero dimension of the 2 codewords of the same user equipment. For example, in an implementation example, no interleaving occurs between codewords 1 and 2 of the user equipment UE1, or it can be said that an interleaving that maintains the original sequence occurs. The interleaving (exchanging) occurs in the 2nd dimension of codewords 1 and 2 of the user equipment UE2. The interleaving (exchanging) occurs in the 3d and 4th dimensions of codewords 1 and 2 of the user equipment UE3. The interleaving (exchanging) occurs in the 3rd dimension of codewords 1 and 2 of the user equipment UE4. It is to be noted that FIG. 5D shows only the examples of the possible interleaving, and it does not mean that the interleaving operation for individual user equipments is limited thereto.

As shown in FIG. 5D, after the above interleaving operation, although the overlapped transmission resources used between different user equipments are not changed depending on the codebook, the components of the codeword transmitted by the specific time domain module using the overlapped transmission resources come from two codewords participating in the interleaving, for example, for the codeword 1 of the 1st user equipment, although still subject to interference from the two dimensions (1st and 2nd dimensions) of the 2nd user equipment, the interference from these two dimensions comes from the codewords 1 and 2 of the second user. That is, inter-codeword interference of the user equipment due to overlapped transmission resources used is dispersed over two codewords transmitted in different resources, such as the time domain modules, e.g., the time slots, and the overlapped dimension of any codewords of the user equipment with any codeword of other user equipments is not more than 1. This means that the correlation between different user equipments in the SCMA system according to the present embodiment is reduced. It can be seen that after the interleaving operation, any one column overlaps with all other columns by at most 1 dimension. That is, the added interleaving operation breaks the 4-side-circle structure in the known SCMA system, thereby both reducing the correlation during SCMA and sustaining the substantial performance gain thereof, which improves the system performance.

3-4. Electronic Device on the Receiving Side According to the First Embodiment

Figure 6:
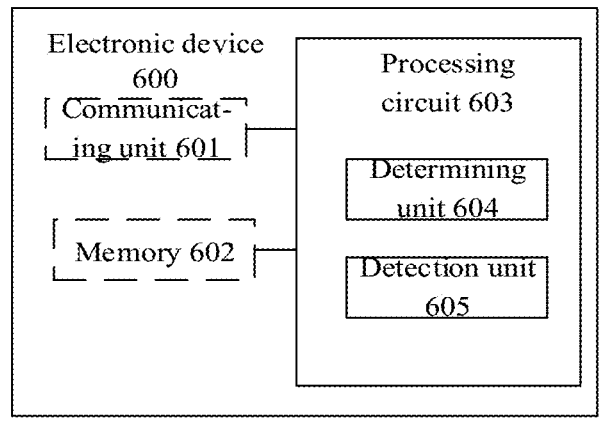
FIG. 6 is a block diagram illustrating an electronic device on a receiving side according to the first embodiment of the present disclosure.

FIG. 6 is a block diagram illustrating an electronic device 600 on the receiving side according to the present embodiment.

The electronic device 600 can include a communication unit 601, a memory 602, and a processing circuitry 603.

The communication unit 601 can be configured to communicate with the electronic device 200 on the transmitting side, which will be described below, under the control of the processor circuit 603. The communication unit 601 can be implemented as a transmitter or a transceiver. In one instance, communication unit 601 can be implemented as a communication interface component, such as an antenna device and a radio frequency circuit. The communication unit 601 is depicted by a dashed line because it may also be located internal to the processing circuitry 603 or external to the electronic device 600.

The memory 602 can store information generated by the processing circuit 603, programs and data for operation of the electronic device 600, and data and information to be transmitted by the communication unit 601, and the like. The memory 602 is depicted by a dashed line because it can also be located internal to the processing circuitry 604 or external to the electronic device 600. The memory 602 can be a volatile memory and/or a non-volatile memory. For example, the memory 602 can include, but is not limited to, a Random Access Memory (RAM), a Dynamic Random Access Memory (DRAM), a Static Random Access Memory (SRAM), a Read-Only Memory (ROM), a flash memory, and the like.

The processing circuitry 603 of the electronic device 600 can provide various functions of electronic device 600. For example, the processing circuit 603 can include a determination unit 604 and a detection unit 605.

The determination unit 604 can be configured for determining the SCMA information on codebook and the information on interleaving configuration. As mentioned above, the SCMA information on codebook may include information on resource allocation and/or information on constellation modulation. The information on interleaving configuration is information about the configuration of the interleaver (for example, the interleaving unit 205 of the electronic device 200) used in the device on the transmitting side, and as mentioned above, the interleaver is configured based on the respective information on codebook. The information on interleaving configuration can also be referred to the detailed description of the following section 4-3. In one example, the information on interleaving configuration may include an identification number of the interleaver, and information about the interleaver corresponding to the identification number has been previously stored in the electronic device 600. In another example, the information on interleaving configuration may also include the interleaving criteria employed by the interleaver and the categories of interleavers, such that the electronic device 600 can derive a particular configuration of the interleaver. The information on interleaving configuration may also be other types of information, as long as the electronic device 600 is able to perform a detection based on the information on codebook and the information on interleaving configuration determined by the determination unit 604. It is to be noted that since the electronic device on the receiving side is required to perform a multi-user detection algorithm, the information on codebook and the information on interleaving configuration determined by the determination unit 604 are associated with all user equipments participating in SCMA.

In one example, when the electronic device 600 is implemented as a control device, the control device may generate the information on codebook for all user equipments participating in SCMA through a codebook design method and a codebook allocation method. Based on the information on codebook, the control device can configure an interleaver for all user equipments and generate respective information on interleaver configuration through a specific interleaver design method. The above process may be implemented by the processing circuit 603 of the electronic device 600, and the determination unit 304 may determine directly the information on codebook and the information on interleaver configuration. In an alternative embodiment, the above process may be implemented by other components, and the information on codebook and the information on interleaver configuration may be input to the determination unit 604.

In another example, when the electronic device 600 is implemented as a user equipment, the determination unit 604 of the electronic device 600 obtains the information on codebook and the information on interleaver configuration transmitted from the control device through the communication unit 601, and the information on codebook and the information on interleaver configuration are the information on codebook of all user equipments participating in SCMA.

The detection unit 605 may be configured to detect the received information based on the information on codebook and the information on interleaver configuration determined by the determination unit 604 to obtain a signal of the respective user equipment. In one example, detection unit 605 can be configured to jointly decode the signals received in a plurality of time domain units (e.g., plurality of time slots) based on information on codebook and interleaver configurator information. For example, the detection unit 605 may generate a joint factor graph matrix based on the information on codebook and the interleaver configurator information, and perform the detection using the generated factor graph matrix. In one example, detection unit 605 can be implemented as an MPA detector.

3-5. Another Communication Method According to the First Embodiment

Figure 7:
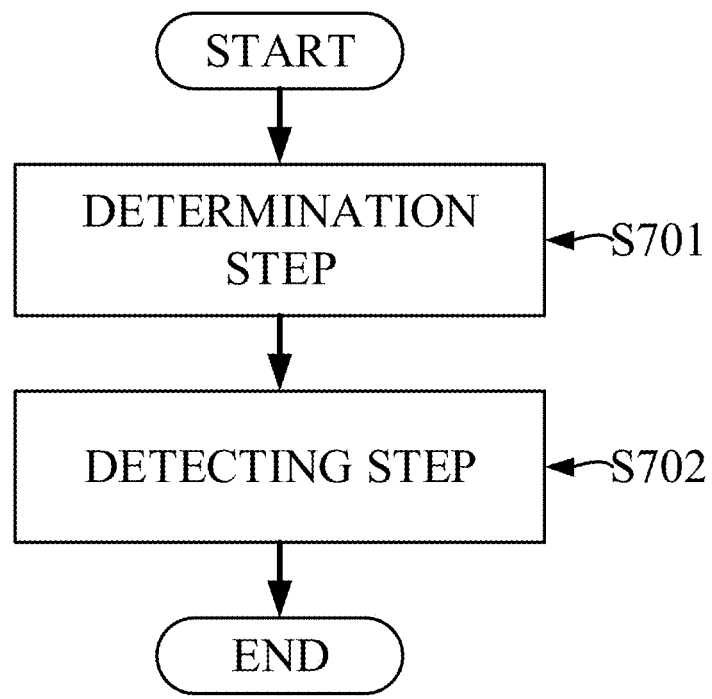
FIG. 7 is a flowchart illustrating a communication method according to the first embodiment of the present disclosure.

FIG. 7 illustrates the flowchart of a communication method for a receiving side of a wireless communication system according to an embodiment of the present disclosure. This communication method can be used, for example, for the electronic device 600 as shown in FIG. 6.

As shown in FIG. 7, in step S701, information on codebook and information on interleaving configuration for non-orthogonal resource based multiple access of a plurality of user equipments are determined. This step can be performed by the processing circuitry, in particular, the determination unit 604, of the electronic device depicted in FIG. 6.

In step S702, the received signal is detected according to the information on codebook and the information on interleaving configuration to obtain a signal of the respective user equipment. This step S702 can be performed by the processing circuit, in particular, the detection unit 605, of the electronic device described in FIG. 6. Similarly, it is desirable that the interleaving operation performed in the step S302 of interleaving can sustain the substantial performance gain of the known SCMA while reducing the correlation during SCMA.

Like the known SCMA system, the device on the receiving side such as the electronic device 300 according to the present embodiment can be implemented as an MPA detector to distinguish different user equipments and different codewords using an MPA detection. However, unlike the known SCMA system, since the interleaving operation is used on the transmitting side, the electronic device 300 should perform the detection after receiving the complete QK-dimensional overlapped symbol $y \in \mathbb{C}^{QK}$. In addition, as shown in FIG. 1A, the object for the MPA detection in the known SCMA is a K-dimensional overlapped symbol $y \in \mathbb{C}^K$, and there are only J variable nodes and K function nodes on the factor graph, and a connection relationship therebetween can be directly determined by a factor graph matrix with the K×J dimensions. However, in this embodiment, there are QJ variable nodes and QK function nodes on the factor graph of the MPA, and it is necessary to use a factor graph matrix with QK×QJ dimensions (referred collectively to as a joint factor graph matrix hereinafter) to completely characterize the connection relationship therebetween.

Figure 8:
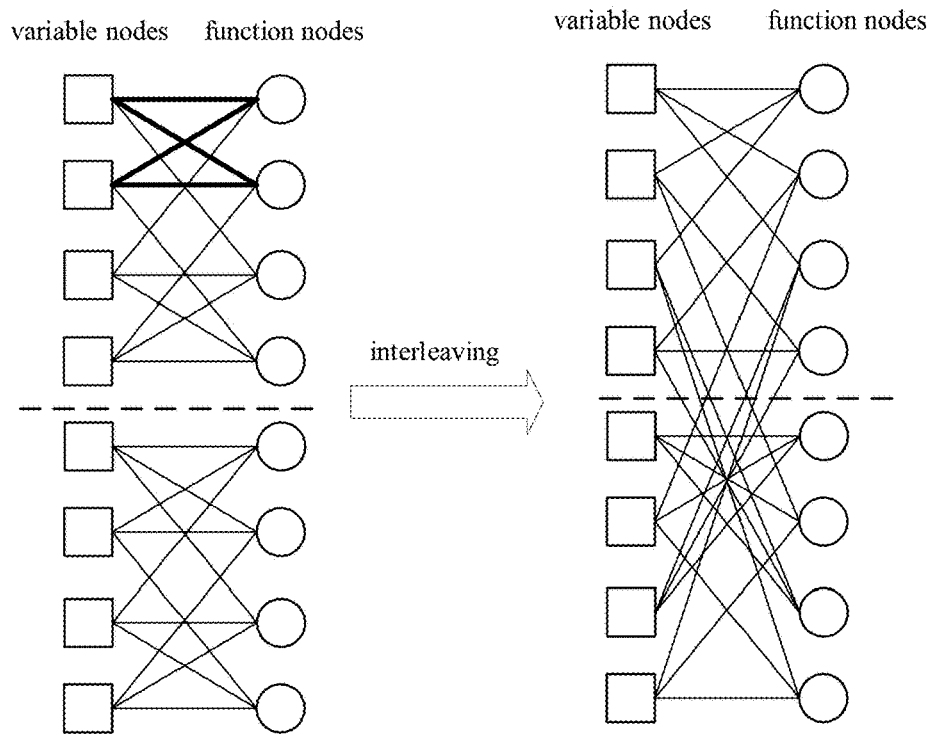
FIG. 8 is a diagram illustrating a receiver factor graph corresponding to the joint factor graph matrix in FIG. 5D by a comparison with the factor graph in FIG. 1B.

The detection unit 605 of the electronic device 600 can perform the detection in accordance with the joint factor graph matrix shown on the right side in FIG. 5D. FIG. 8 shows an example of a receiver factor graph corresponding to the joint factor graph matrix of FIG. 5D.

The factor graph on the left side in FIG. 8 corresponds to the joint factor graph matrix on the left side in FIG. 5D for the known SCMA detector. The SCMA detector, for example, the MPA detector, performs a codeword detection on the signal received in the 1st time slot and the signal received in the 2nd time slot, respectively.

The factor graph on the right side in FIG. 8 corresponds to the joint factor graph matrix on the right side in FIG. 5D for the SCMA detection unit 605 according to this embodiment. According to the joint factor graph matrix of the present embodiment, the detection unit 605 of the electronic device 300 performs a joint detection on the signals received in the 1st and 2nd time slots. There are QJ=8 variable nodes and QK=8 function nodes included in the factor graph. There is no 4-side-circle structure in the factor graph. Therefore, the addition of the interleaving operation can effectively break the 4-side-circle structure, thereby both reducing the correlation during SCMA and sustaining the substantial performance gain of the known SCMA, which improves the detection accuracy of the detection unit 605.

An example of an electronic device on the transmitting and the receiving sides according to the present embodiment has been described in detail above with reference to the accompanying drawings. The electronic devices 200 and 600 and various units thereof are exemplary and/or preferable modules for implementing the processes described in the present disclosure. These modules may be hardware units, such as central processing units, field programmable gate arrays, and digital signal processing or application specific integrated circuits, etc., software modules, such as computer readable program instructions, or combinations thereof.

Furthermore, a device composed of various modules can be incorporated as a functional module into a hardware device such as a computer. In addition to those functional modules, the computer may of course have other hardware or software components.

3-6. Signaling Flow According to the First Embodiment

The communication process of the SCMA system according to the present embodiment is described in detail below for two application scenarios of uplink and downlink transmissions. The SCMA system according to the present embodiment will be referred to as an Interleaved SCMA (I-SCMA) system hereinafter, and a specific implementation example thereof will be given later in Sections 4 and 5.

3-6-1. Uplink Transmission Signaling Flow According to the First Embodiment FIG. 9A shows an uplink transmission signaling flow according to the present embodiment.

In the case of the uplink transmission, the electronic device 200 may be implemented as a user equipment, and the electronic device 300 may be implemented as a control device, such as a base station.

In one example, in addition to the communication unit 201, the memory 202, and the processing circuit 203, the electronic device 200 includes a plurality of SCMA encoders for a parallel transmission of multiplexed data of which each can be considered as one of the users in the above example to perform the SCMA operation. The plurality of SCMA encoders may be implemented by the processing circuit 203 or components other than the processing circuit 203. Accordingly, the electronic device 200 includes a plurality of interleaving units 205 corresponding to the plurality of SCMA encoders. The interleaving unit 205 can be implemented as an interleaver. The communication unit 201 can be implemented as an SCMA transmitter or transceiver.

Figure 9A:
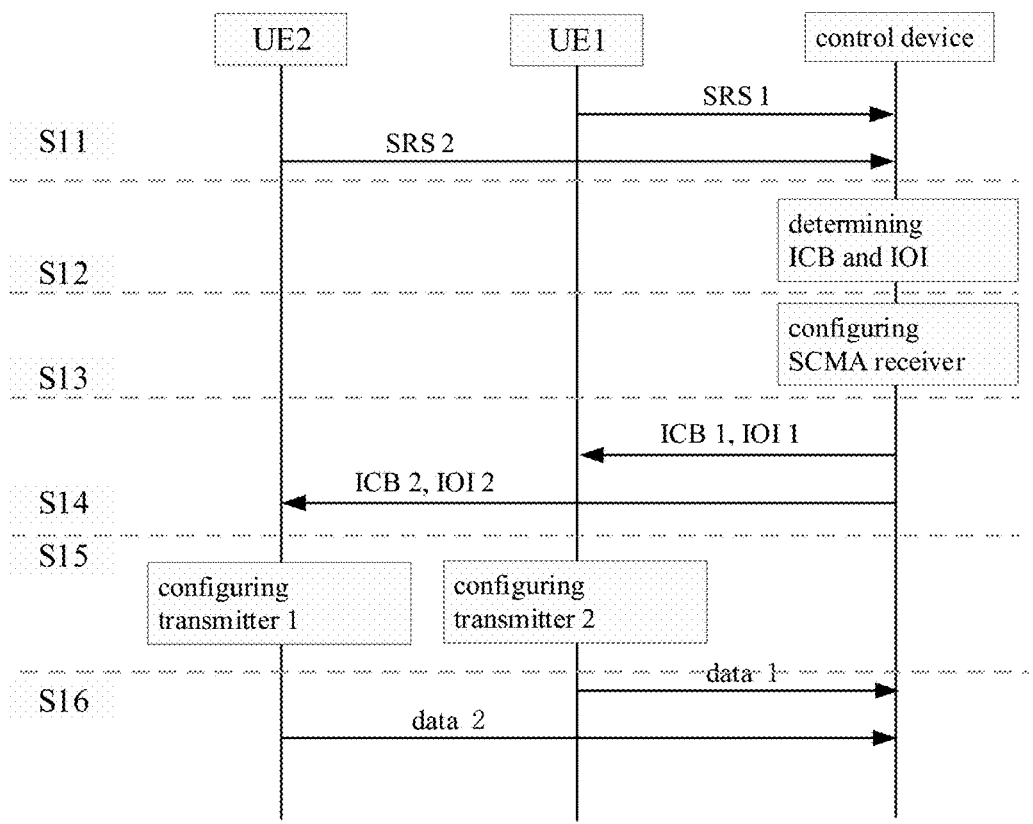
FIG. 9A is a signaling flowchart illustrating an uplink transmission of an I-SCMA (Interleaved SCMA) system according to the first embodiment of the present disclosure.

As shown in FIG. 9A, in step S11, the user equipments UEs 1 and 2 respectively transmit, for example, the channel sounding reference signal SRS mentioned in the concept introduction of the 1st section hereinabove to the control device for uplink channel estimation of UEs 1 and 2.

In step S12, the control device determines the information on codebook (ICB) and the information on interleaver (IOI) (or may also be referred to as information on interleaving configuration) of the UEs 1 and 2 based on a predetermined algorithm. Based on the individual channel states of the UEs 1 and 2, the control device performs the codebook design and the codebook allocation (the process may also be considered as part of an uplink scheduling in some examples, and related work can be understood by referring to Sections 1-2, a detailed description thereof is omitted), determines the ICBs of the UEs 1 and 2; based on the ICBs of the UEs 1 and 2, the control device designs an interleaver to be used by the UEs 1 and 2, and determines the IOI of the UEs 1 and 2, wherein for different codebook designs, different interleaving criteria mentioned in Section 3-3 hereinabove may be used. Therefore, the step S12 may correspond to the step S701 of determining in the method performed by the receiving side in FIG. 7.

In step S13, the control device configures the SCMA receiver based on the ICB and the IOI of the UEs 1 and 2. For example, the control device can configure the MPA detector based on the ICB and the IOI of the UEs 1 and 2.

In step S14, the control device transmits the information on codebook ICB 1, for example, V1 and the respective constellation, and the information on interleaver configuration IOI 1 for the UE1 to the UE1, and the information on codebook ICB 2, for example, V2 and the respective constellation, for the UE2 and the information on interleaver configuration IOI 2 to the UE 2, thus the step S14 may correspond to the step S301 of determining in the method performed by the transmitting side in FIG. 3. In some examples of a fast dynamic scheduling, the control device incorporates the information on codebook and the information on interleaver configuration into an uplink grant (UL grant) format of the downlink control information (DCI) of the physical layer for providing to the UE. In other examples of a slower resource allocation, the control device incorporates the information on codebook and the information on interleaver configuration into a control element of the MAC layer for providing to the UE. In still another example of a semi-statically allocating resources, the control device incorporates the information on codebook and the information on interleaver configuration into a control message, e.g., an RRC message, of the higher layer for providing to the UE. In an alternative example, the order in which the steps S13 and S14 are performed may be reversed, or may be performed simultaneously. In addition, it can be understood that in an example in which a certain UE supports a multiplexed SCMA transmissions, the control device transmits a plurality of information on codebook and a plurality of information on interleaver configuration for the UE to that UE.

In step S15, the UEs 1 and 2 configure an SCMA transmitter or transceiver based on individual ICB and IOI information, respectively, and the UEs 1 and 2 then transmit simultaneously data to the control device. Therefore, the step S15 may correspond to the step S302 of interleaving in the method performed by the transmitting side in FIG. 3. For example, the user equipment UE1 may configure the SCMA encoder thereof based on ICB 1 for SCMA encoding the data to be transmitted; UE1 may also configure the interleaver thereof based on IOI 1 for interleaving the codewords encoded by the SCMA encoder. The user equipment UE2 also performs similar operations. UEs 1 and 2 then transmit simultaneously the data of the interleaved codewords by the transmitter or transceiver using the set of transmission resources.

In step S16, the control device detects the received signal, i.e., the interleaved codeword data, according to the information on codebook ICB and the information on interleaving configuration IOI, so as to obtain a signal of the respective user equipment. For example, the control device detects the signal using an SCMA receiver configured based on the ICB and IOI of the UEs 1 and 2. Therefore, step S16 may correspond to the step S702 of detecting in the method performed by the receiving side in FIG. 7.

3-6-2. Downlink Signaling Flow According to the First Embodiment

Figure 9B:
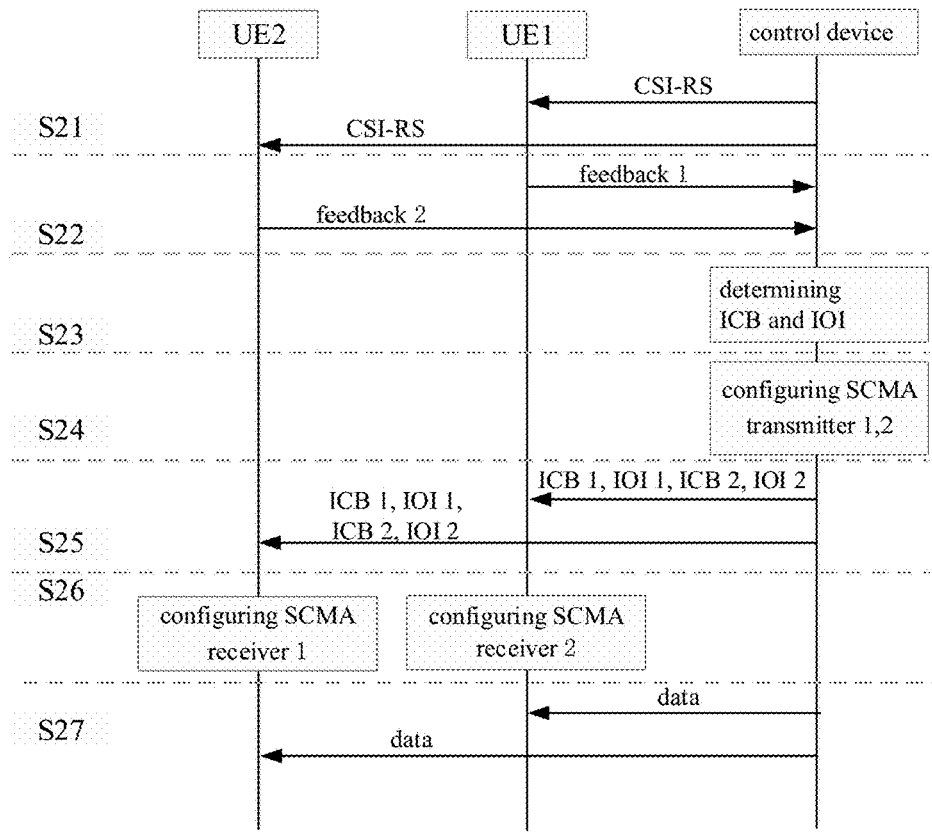
FIG. 9B is a signaling flowchart illustrating a downlink transmission of the I-SCMA system according to the first embodiment of the present disclosure.

FIG. 9B shows a downlink transmission signaling flow according to the present embodiment.

In the case of downlink transmission, the electronic device 200 can be implemented as a control device, such as a base station. The electronic device 300 can be implemented as a user equipment.

In one example, in addition to the communication unit 201, the memory 202, and the processing circuitry 203, the electronic device 200 includes a plurality of SCMA encoders. The SCMA encoders may or may not be implemented by the processing circuit 203. Accordingly, the electronic device 200 includes interleaving unit(s) 205 corresponding to the SCMA encoders. The interleaving unit 205 can be implemented as an interleaver. The communication unit 201 can be implemented as an SCMA transmitter or transceiver.

As shown in FIG. 9B, in step S21, the control device transmits, for example, the cell-specific reference signal CSI-RS mentioned in the concept introduction of the 1st section hereinabove to the user equipments UEs 1 and 2 for downlink channel estimation.

In step S22, the UEs 1 and 2 feed back the individual downlink channel states to the control device.

In step S23, the control device determines the information on codebook ICB and information on interleaver configuration IOI of the UEs 1 and 2 based on a predetermined algorithm. Therefore, step S23 may correspond to the step S301 of determining in the method performed by the transmitting side in FIG. 3. Based on the individual channel states of the UEs 1 and 2, the control device performs the codebook design and the codebook allocation (the process is part of a downlink scheduling in some examples), determines the ICBs of the UEs 1 and 2; based on ICB of the UEs 1 and 2, the control device designs an interleaver to be used by the UEs 1 and 2, and determines the IOI of the UEs 1 and 2, wherein for different codebook designs, different interleaving criteria mentioned above may be used.

In step S24, the control device configures the SCMA transmitter or transceiver corresponding to the UEs 1 and 2 with the determined ICB and IOI. In particular, the control device configures an SCMA encoder for UE1 based on the ICB 1 of the UE1, and configures an interleaver corresponding to the SCMA encoder of the UE1 based on the IOI1 of the UE1; and configures an SCMA encoder for the UE2 based on the ICB2 of the UE2, and configures an interleaver corresponding to the SCMA encoder of the UE2 based on the IOI2 of the UE2.

In step S25, the control device transmits the ICBs, e.g., F and respective constellation, and IOIs of all UEs to the UEs 1 and 2. Therefore, step S25 may correspond to the step S701 of determining in the method performed by the receiving side in FIG. 7. Because each UE is to use a multi-user detection algorithm, it is required to know the ICB and IOI of all user equipments. Of course, in that step S25, the control device will also identify the ICB and the IOI for the data of certain UE itself, for example, by arranging the sequence of the ICBs and the IOIs of the individual UEs, ranking the ICB and the JOT for the certain UE itself to be the first for the identifying, or by adding an additional flag for the identifying. In some examples of fast dynamic scheduling, the control device incorporates the information on codebook and the information on interleaver configuration of all user equipments into a downlink grant (DL grant) format of the downlink control information (DCI) of the physical layer for providing to the UE. In other examples of slower resource allocation, the control device incorporates the information on codebook and the information on interleaver configuration of all user equipments into a control element of the MAC layer for providing to the UE. In still another example of semi-statically allocating resources, the control device incorporates the information on codebook and the information on interleaver configuration of all user equipments into a control message, e.g., an RRC message, of the higher layer for providing to the UE. Since the signaling resources are relatively precious while the amount of ICB and IOI data of all UEs is large, preferably, the control device can also transmit in the signaling in the above example by an encoding with certain criterion. In an alternative example, the order in which the steps S24 and S25 are performed may be reversed, or may be performed simultaneously.

In step S26, the UEs 1 and 2 configure the SCMA receivers thereof based on the ICB and the IOI of all UEs. For example, the UEs 1 and 2 configure the MPA detectors thereof based on the ICB and the IOI of all UEs.

Then, in step S27, the control device transmits the multi-codeword interleaved data of the UEs 1 and 2 to the UEs 1 and 2 using SCMA transmitter configured based on the ICB and the IOI of the UEs 1 and 2, respectively. Therefore, the step S27 may correspond to the step S302 of interleaving in the method performed by the transmitting side in FIG. 3.

Subsequently, in a step not shown, the UEs 1 and 2 detect the received signal, i.e., the data of the interleaved codeword, according to the information on codebook ICB and the information on interleaving configuration IOI to obtain a signal of the respective user equipment. For example, the UEs 1 and 2 detect signals using a multi-user detector configured based on the ICB and the IOI of all UEs. Therefore, this step may correspond to the step S702 of detecting in the method performed by the receiving side in FIG. 7.

3-7. Technical Effects According to the First Embodiment

Figure 10:
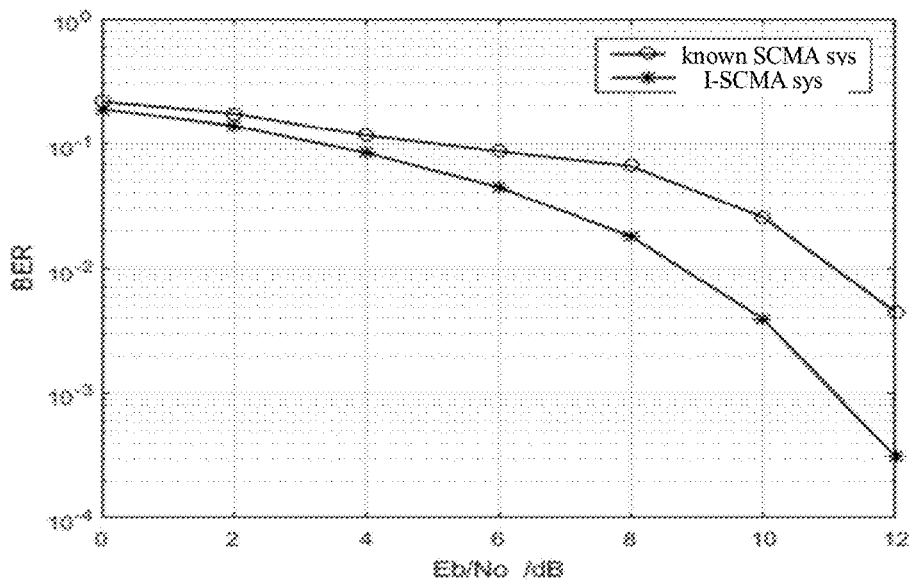
FIG. 10 is a diagram illustrating simulation result of the I-SCMA system according to the first embodiment of the present disclosure.

The inventors of the present disclosure verify such improvement in performance by a simulation. FIG. 10 shows the simulation result of the BER performance for a known SCMA system and an I-SCMA system according to an embodiment of the present disclosure. The simulation considers the case of an uplink transmission and assumes that J=4, K=4, N=3, M=4, and Q=2. The known SCMA system and the I-SCMA system according to an embodiment of the present disclosure use the same codebook design: the mother constellation is consisted of the same 4QAM in N=3 dimensions, and the difference of the phase rotation angle of the constellation between different user equipments is 22.5 degrees; the mapping matrix uses the factor graph matrix F mentioned in section 2 above. It is assumed that the channel state is perfect, that is, the channel state coefficients of individual user equipments are "1". The number of iterations of the MPA algorithm is 10. The simulation result obtained is shown in FIG. 10.

As can be seen clearly from FIG. 10, the BER performance of the I-SCMA system including the interleaver is significantly better than that of the known SCMA system that does not include an interleaver. Therefore, the I-SCMA system according to the first embodiment of the present disclosure is able to effectively improve the detection accuracy of the receiving side and enhance the system performance.

The electronic device, the communication method, the signaling flow, the technical effect, and the like according to the first embodiment of the present disclosure have been described above with reference to the drawings. In order to facilitate a better understanding of the above aspects, a specific implementation example of the first embodiment will be described in detail below by taking SCMA as an example. Although the following implementation examples is a discussion for the SCMA system, it should be noted that they can also be adapted to other non-orthogonal-resource based multiple access systems, such as the PDMA system, by adaptive variants.

4. Implementation Example 1 of the First Embodiment 4-1. I-SCMA System According to Implementation Example 1

Figure 11:
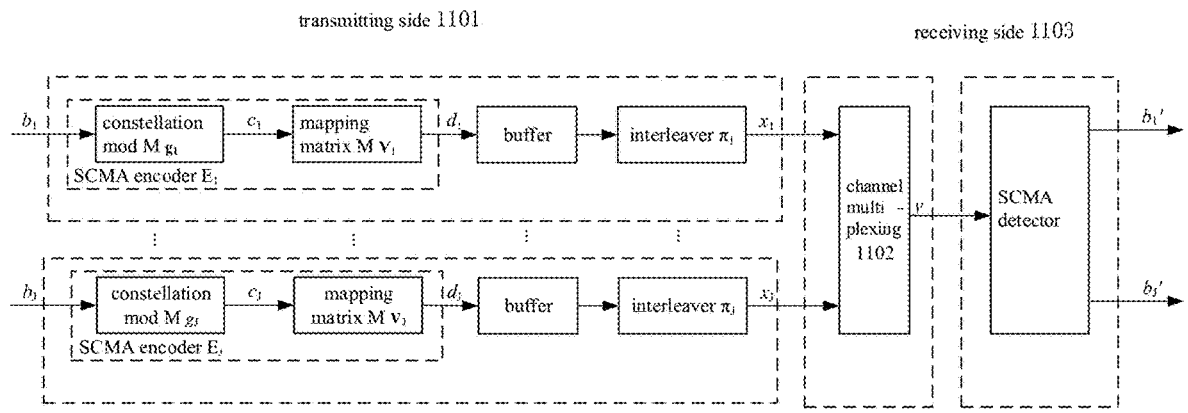
FIG. 11 is a structural block diagram illustrating a 1st type of I-SCMA system according to an implementation example of the present disclosure.

FIG. 11 is a block diagram illustrating an I-SCMA system according to the implementation example 1 of the first embodiment of the present disclosure. Compared with the SCMA system described with reference to FIG. 1, a transmitting side portion 1101 of the SCMA system according to the implementation example 1 further includes a buffer and an interleaver of which both are subsequent to a constellation modulation module and a mapping matrix module in the SCMA encoder. Hereinafter, an I-SCMA system having such configuration will be referred to as a 1st type of I-SCMA system. The description for the same portions as those in FIG. 1 will be omitted.

It is assumed as well that the data of J user equipments are to be transmitted. On the transmitting side, the bit information $b_1, \ldots, b_J$ of the J user equipments are SCMA encoded by the individual SCMA encoders. For the jth ($j \in 1, \ldots,$) user equipments, the bit information thereof ($b_j \in \mathbb{B}^{\log M}$) is encoded by the SCMA encoder thereof into a K-dimension complex codeword $d_j$.

However, the bit data information $b_j$ is not directly transmitted after being encoded into a sparse complex codeword $d_j$, but waits in a buffer for generation of subsequent codewords from the user equipment. When there are Q complex codewords $d_j^1, d_j^2, \ldots, d_j^Q$ in the buffer, where Q is a predetermined or pre-configured positive integer and $Q \geq 2$, the complex codewords are interleaved by the respective interleaver $\pi_j$ to obtain a QK-dimensional complex joint codeword $x_j$. The interleavers $\pi_j$ for different user equipments are different from each other.

Then, the complex joint codeword $x_j$ obtained by the interleaving is transmitted to the receiving side. The QK-dimensional complex codewords $x_1, \ldots, x_J$ from the J users are transmitted over the same set of transmission resources, and superimposed into an overlapped signal after a channel multiplexing. The receiving side receives the overlapped signal, and the MPA detector on the receiving side detects the overlapped signal and generates detected bits $b_1', \ldots, b_J'$ based on the information on codebook, the information on interleaver, the channel states, and the like of individual user equipments.

The difference in the SCMA system according to the present embodiment as compared with the known SCMA system described with reference to FIG. 1 is in that it further includes a buffer and an interleaver. The sparse codeword $d_j$ generated by the SCMA encoder is buffered temporarily in the buffer instead of being transmitted immediately, and a predetermined number (e.g., Q) of sparse codewords are interleaved to generate the interleaved joint codeword until the Q sparse codewords are buffered. Here, the interleaving operation performed by the interleaver is performed on at least two codewords of the same user equipment, and selectively conforms to the interleaving criterion 1 or 2 as described in Section 3-3 above based on the information on codebook. Therefore, the I-SCMA system according to the present embodiment is a system for interleaving, transmission and detection of multi-codeword, and is a long spreading/interleaving based system.

It is to be noted that although the MPA detector used in the 1st type of I-SCMA system in FIG. 11 is depicted to be the same as that used in the known SCMA system in FIG. 1, it performs the detection based on information (information on interleaver configuration) about the interleaver used on the transmitting side, in addition to the information on codebook, the channel state.

4-2. Interleaver According to Implementation Example 1

On the transmitting end portion of the 1st type of I-SCMA system, the interleaver is subsequent to the SCMA encoder and configured to interleave a plurality of sparse codewords generated by the SCMA encoder for the same user equipment.

It is desired that the difference in the codebooks designed for the user equipment is not corrupted while the interleaver performs the interleaving operation. Therefore, the applicable interleaver can be implemented based on the interleaving criteria 1 and 2 as described above. An exemplary implementation of an interleaver suitable for the 1st type of I-SCMA system is described below.

4-2-1. Implementation of Interleaver Based on Interleaving Criterion 1

In 1st type of I-SCMA, the cache and the interleaver are placed subsequent to the SCMA encoder, thus the input to the interleaver is Q sparse codewords $d_j^1, d_j^2, \ldots, d_j^Q$ (there are QK codeword elements in total). For those sparse codewords, the interleaver is required to ensure that the positions where the codeword elements are 0s are constant, so that the interleaving operation only occurs in the positions where the codeword elements are not 0s, i.e., the occupied element as mentioned in the concept introduction in the 1st section hereinabove.

For J user equipments, it is generally necessary to implement J different interleavers. In one example, one of the J interleavers can be designed as an original-sequence interleaver, that is, the positions are not exchanged.

In one example, the algorithm for implementing those J interleavers is as follows:

1) for the user equipment j ($1 \leq j \leq J$), analyzing the factor graph matrix in the SCMA codebook, and selecting the dimensions set to 0s in the jth column, for example, the dimensions $i_j^1, \ldots, i_j^{K-N}$ (number of K−N in total);

2) the positions where the elements are 0s are $i_j^1, \ldots, i_j^{K-N}$, $i_j^1+K, \ldots, i_j^{K-N}+K, \ldots, i_j^1+(Q-1)K, \ldots, i_j^{K-N}+(Q-1)K$ respectively corresponding to the input sparse codeword;

3) ensuring that the codeword elements in the positions as described above is not shifted, and randomly interleaving the codeword elements in other positions.

4) repeating 1), 2), and 3), until the interleavers of all user equipments are generated, the random interleavers of different user equipments being different from each other, and the length of interleaver being QK.

The J interleavers implemented according to the above examples can scramble the codeword elements on the overlapped dimensions of the user equipment with a high probability, especially when the number Q of the interleaved codewords is large.

The interleaver implemented according to the above example is a random interleaver. Due to the randomness, the 4-side-circle structure is eliminated to some extent.

As another preferred example, the interleavers for individual user equipments may be a non-overlapping interleaver.

Any one of interleavers can be represented by an interleaved sequence, for example, (4, 3, 1, . . . ) indicates that the 4th element of the original sequence is placed in the 1st position of the interleaved sequence, and the 3rd element of the original sequence is placed in the 2nd position of the interleaved sequence, and so on. A non-overlapping interleaver can be defined as: the elements of any two of the interleaved sequences (two interleavers) in the same position are different from each other. A separate non-overlapping interleaver does not guarantee a complete avoidance of a case where the overlapped dimension between any two codewords subjected to interleaving is greater than 1. A more preferred embodiment with respect to the non-overlapping interleaver for a complete avoidance of the case where the overlapped dimension between any two codewords subjected to interleaving is greater than 1 can be seen in Section 4-2-2.

An example of a non-overlapping interleaver is a shift interleaver, and a method of generation thereof is as follows:
1) generating a first ascending sequence (1, 2, 3, ..., Q−2, Q−1, Q);
2) shifting translationally the sequence to the left or right to generate a second sequence, such as (Q, 1, 2, 3, ..., Q−2, Q−1);
3) shifting translationally the second sequence to the same direction to generate a third sequence, such as (Q−1, Q, 1, 2, 3, ..., Q−2);
4) repeating the steps of translational shifting;
5) continuing to generate all of the ordered sequences required, or shifting back to the first ordered sequence.

Based on the above algorithm, Q shift interleavers can be generated. The resulting shift interleavers can be used as the interleavers of individual user equipments. That method is especially suitable for the case where Q is large, so that the generated Q shift interleavers satisfy the requirements of J user equipments.

Although the generation of a shift interleaver as a non-overlapping interleaver is exemplified in the above example, other types of non-overlapping interleavers can also be used. The interleaver for the J user equipments may also be a combination of a random interleaver and a non-overlapping interleaver.

4-2-2. Implementation (Design) of Interleaver Based on Interleaving Criterion 2

In the 1st type of I-SCMA, the input to the interleaver is a sequence consisted of Q sparse codewords. The position of the kth (1≤k≤K) dimensional components of the Q codewords in the input sequence is: k, k+K, k+2K, ..., k+(Q−1)K. Based on the interleaving criterion 2, the interleaving operation is required to occur in the same dimension of different codewords, i.e., it is required that only the interleaving of codeword elements on k, k+K, k+2K, k+(Q−1)K is can be performed.

Figure 12A:
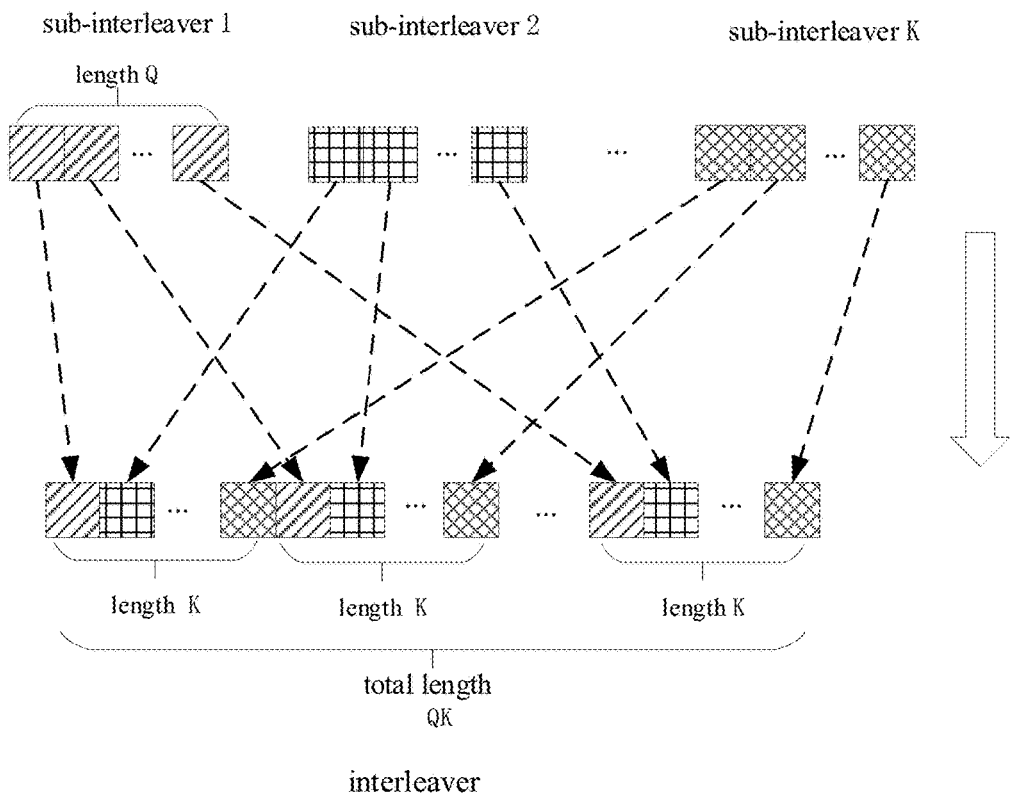
FIG. 12A is a diagram illustrating an implementation of an interleaver of a user equipment by alternately combining the sub-interleavers in accordance with the implementation example of the present disclosure.

In order to achieve the above requirement on interleaving, it is proposed in the present disclosure a method for implementation of interleaver based on sub-interleaver, that is, an interleaver with a length of QK is generated by an alternate combination of K sub-interleavers with a length of Q, as shown in FIG. 12A. In FIG. 12A, after the alternate combination, a sub-interleaver 1 will operate on the 1st dimension of Q codewords (Q=2 in FIG. 12A), and perform an interleaving of the codeword elements in the positions 1 and 1+K (=5) (K=4 in FIG. 12A); the sub-interleaver 2 will operate on the 2nd dimension of the Q codewords, and perform an interleaving of the codeword elements in the positions 2 and 2+K (=6), and so on. Only the codeword elements belonging to the same dimension are interleaved due to the operations of the sub-interleavers, and an interleaving of the elements in different dimensions will not occur, since different sub-interleavers are used between different dimensions. The sub-interleaver in dimension k will only perform the interleaving of codeword elements on k, k+K, k+2K, ..., k+(Q−1)K.

Based on the above method for implementation, it is necessary to be clarified how to combine alternately the sub-interleavers into an interleaver. The sub-interleaver/interleaver can be represented by an interleaved sequence $(i_1, i_2, i_3, \ldots)$ hereinbelow. With this premise, an algorithm for the alternate combination of the interleavers formed by K sub-interleavers with a length of Q is as follows:
1) performing a transformation on the interleaved sequence $i_q^{(k)} = k + (i_q - 1)K$ for the sub-interleavers $(i_1, \ldots, i_q, \ldots i_Q)$ on the dimension k (1≤k≤K) firstly to form a new interleaved sequence $(i_1^{(k)}, \ldots i_q^{(k)}, \ldots i_Q^{(k)})$, the interleaved sequence being transformed into the positions of the codeword elements participating in the interleaving;
2) performing an alternate combination in the following order after the sub-interleavers in all dimensions performs the transformation of the interleaved sequence, to form the required interleaver:
$(i_1^{(1)}, i_1^{(2)}, \ldots i_1^{(K)}, i_2^{(1)}, i_2^{(2)}, \ldots, i_2^{(K)}, \ldots, i_Q^{(1)}, i_Q^{(2)}, \ldots, i_Q^{(K)})$.

Since the sub-interleaver only performs the interleaving between codeword elements on the same dimension, all interleavers of different users formed by the alternate combination of the sub-interleavers into can satisfy the interleaving criterion 2.

Based on the above discussion, the implementation method for a first exemplary embodiment of the interleaver for J user equipments is as follows:
1) generating JK different sub-interleavers with a length of Q, the sub-interleaver may be a random interleaver or a non-overlapping interleaver;
2) allocating K sub-interleavers for user equipment j (1≤j≤J) for an interleaving of the elements in the same dimension of different codewords, the K sub-interleavers being alternately combined (for example, using the algorithm for alternate combination as described above) to form an interleaver $\pi t_j$;
3) repeating 2), until the interleavers of all user equipments are generated.

The method for implementation of the interleaver according to this example is applicable to the case where Q is large. For J user equipments, a total of JK different sub-interleavers is required to be allocated, therefore, the above method for implementation requires a sufficient number of sub-interleavers to be generated. When Q is small, JK different sub-interleavers may not be generated. For example, when J=4, K=4, N=3, and Q=2, since the length of the sub-interleaver is 2, there are only two different sub-interleavers while the number of sub-interleavers required at this time is 16.

To this end, it is proposed a second method for exemplary implementation which reduces the required number of the sub-interleavers is to a greater extent by allocating rationally the sub-interleaver and has more adaption. Since the main purpose of the interleaver is to make the overlapped dimensions between the codewords of different user equipments not greater than 1, different user equipments can use the same sub-interleaver in a certain overlapped dimension to maintain 1 dimension of the overlapping between the codewords, and different sub-interleavers are used on other overlapped dimensions to prevent an overlapping between the same codewords. For example, as shown in FIG. 5D, for user equipments UEs 1 and 2, before the interleaving is performed, the 1st and 2nd dimensions of the codeword 1 of the two user equipments are overlapped with each other. At this time, the two user equipments use the same sub-interleaver in dimension 1 (for example, the orders of the codeword elements of the 1st dimension are not exchanged), then the codewords 1 of the two user equipments continue to be overlapped with each other in the 1st dimension, but the two user equipments will use different sub-interleavers on the 2nd dimension 2 (e.g., the UE1 does not exchange the orders of the codeword element in the 2nd dimension, and the UE2 exchanges the orders of the codeword element in the 2nd dimension), then the codewords 1 of the two user equipment will not be overlapped with each other in the 2nd dimension.

Based on the above discussion, in one example, the algorithm for generating the interleaver of each user equipment by allocating sub-interleavers is as follows:

1) generating a plurality of different sub-interleavers with a length of Q, of which the identification numbers are 1, 2, 3 . . . , and the sub-interleaver may be a random interleaver or a non-overlapping interleaver;
2) allocating the sub-interleavers to the non-zero dimensions occupied by individual user equipments based on the factor graph matrix of SCMA:
    i. using the sub-interleaver 1 in individual non-zero dimensions for the 1st column in the factor graph matrix F, that is, the 1st user equipment;
    ii. using the sub-interleaver 1 in individual non-zero dimensions for the jth column (j≥2) in the factor graph matrix F, and observing the number of overlapped dimensions with all previous columns, different sub-interleavers using the same dimension being considered not to be overlapped;
    iii. jumping to the (j+1)th column, if the overlapped dimensions with all previous columns are not greater than 1; considering the overlapped dimensions greater than 1 should use different sub-interleavers, if the number of overlapped dimensions with any of the previous columns is greater than 1, traversing sequentially the usage of the sub-interleaver 2, the sub-interleaver 3 . . . , until the overlapped dimension is not greater than 1;
    iv. repeating ii., iii., until j=J, the sub-interleavers have been allocated in the non-zero dimensions occupied by all user equipments;
3) allocating the sub-interleaver 1 to the dimension where the elements of individual user equipments are zeros based on the factor graph matrix of the SCMA codebook (since all of the codeword elements of the user equipment in that dimension are zeros, no matter as per which sub-interlace is allocated, the result of the interleaving is still Q zero elements. For convenience, the sub-interleaver 1 can be used in that dimension, and of course other sub-interleavers can be used, or the sub-interleavers are not allocated. The dimension of which the elements are zeros is also allocated the sub-interleavers, for which the purpose is to have K sub-interleavers to be combined alternately into an interleaver, otherwise there will be only N sub-interleavers, and the process for combining into an interleaver with a length of QK will require other processing;
4) performing an alternate combination according to the K sub-interleavers allocated to each user equipment, (using the algorithm of the alternate combination as described above) to form a respective interleaver.

Different sub-interleavers are used in the above algorithm, and the sub-interleaver can be a random interleaver, thus it can be generated by a method for generating a random interleaver. The sub-interleaver can also be a non-overlapping interleaver, such as a shift interleaver.

A specific example of generating the interleaver of the user equipment by alternate combination of the sub-interleavers is exemplified below. It is assumed that J=4, K=4, N=3, and Q=2.

Firstly, a shifted sub-interleaver is generated, which is represented by an interleaved sequence as: a shifted sub-interleaver 1: (1, 2); and a shifted sub-interleaver 2: (2, 1). Because Q=2 in this example, only two shifted sub-interleavers can be generated. The number of sub-interleavers is less than JK, so the first method for implementation cannot be used, and only the second method for implementation can be used, that is, it is required to allocate the interleavers to reduce the required number of sub-interleavers.

According to the above-described method for allocation of the sub-interleavers, the allocation of the sub-interleavers are performed for different users and different dimensions. A sub-interleaver allocation matrix can be used to represent the allocation result:

$$\begin{pmatrix} 1 & 1 & 1 & 1 \\ 1 & 2 & 1 & 1 \\ 1 & 1 & 2 & 2 \\ 1 & 1 & 2 & 1 \end{pmatrix}$$

The matrix indicates which sub-interleaver should be used for each dimension of each user. Taking the user equipment UE2 (the 2nd column) as an example, the user equipment uses the sub-interleaver 1 in the 1st dimension, the sub-interleaver 2 in the 2nd dimension, and the sub-interleaver 1 in the 4th dimension. It should be noted that the diagonal from the upper right to the lower left represents the dimension in which the elements are zeros. For the purpose of facilitating the implementation of the interleaver with a length of QK, the sub-interleaver 1 can be used in this dimension, so the sub-interleaver 1 is used by the user equipment UE2 in the dimension 3. The allocation of the sub-interleavers ensures that any two of the user equipments use the same sub-interleaver only in one overlapped dimension (the dimension of which the elements are zeros are not considered to be overlapped).

Figure 12B:
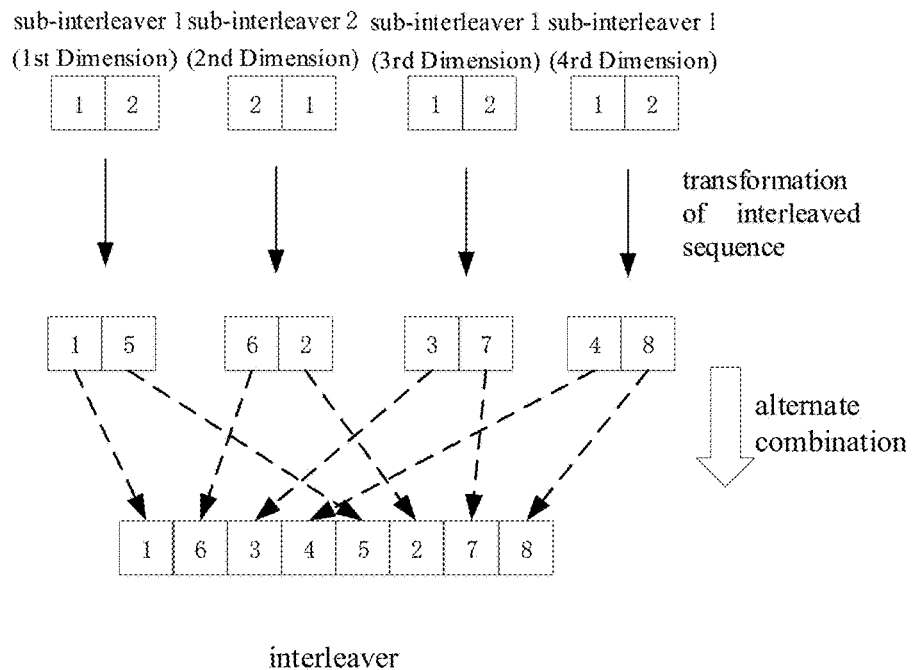
FIG. 12B is a diagram illustrating an implementation example of an interleaver for a user equipment according to the present disclosure.

After the allocation of the interleaver is completed, the respective interleaver is formed by the alternate combination (for example, using the algorithm for alternate combination as described above) according to the K sub-interleavers allocated to the user equipment. The method for non-overlapping interleaver combined with the sub-interleaving design introduced in this section is applicable not only to the interleaving criterion 2 herein, but also to the interleaving criterion 1 in the previous 4-2-1 subsection, so as to be able to ensure that the overlapped dimension between any two codewords subjected to the interleaving are completely avoided to be greater than one. During the alternate combination, it is necessary to change firstly the interleaved sequence of the sub-interleaver according to the dimension in which the sub-interleaver is located. Still taking the user equipment UE2 as an example, with reference to FIG. 12B, the digits in the block indicate the interleaved sequence:

The user equipment uses sub-interleaver 1 in dimension 1, and the interleaved sequence is (1, 2). Since the positions where the codeword elements belonging to the dimension 1 in the Q codewords of the 2nd user equipment are located in the original sequence is 1,5, the interleaved sequence is required to be transformed to match the positions where the codeword elements required to be interleaved are located in. $i_1^{(1)}=1+(1-1)*4=1$, $i_2^{(1)}=1+(2-1)*4=5$. Therefore, the interleaved sequence subjected to the transformation in the 1st dimension is (1, 5).

The 2nd user equipment uses the sub-interleaver 2 in the 2nd dimension, and the interleaved sequence is (2, 1). Similarly, because the positions where the codeword elements belonging to the 2nd dimension are located in the input sequence is 2, 6, in order to match the positions where the codeword components required to be interleaved are located in, the interleaved sequence is transformed: $i_1^{(2)}=2+(2-1)*4=6$, $i_2^{(2)}=2+(1-1)*4=2$ Therefore, the interleaved sequence subjected to the transformation in the 2nd dimension is (6, 2).

Similarly, a transformation of the interleaved sequence of the sub-interleaver in the 3rd and 4th dimensions can be performed to obtain $(i_1^{(3)}, i_2^{(3)})$, i.e., (3, 7), and $(i_1^{(4)}, i_2^{(4)})$, i.e., (4,8).

The transformed sub-interleavers are alternately combined to obtain an interleaver of the 2nd user equipment, and the interleaved sequence is $(i_1^{(1)}, i_1^{(2)}, i_2^{(1)}, i_2^{(2)}, i_3^{(1)}, i_3^{(2)}, i_4^{(1)}, i_4^{(2)})$, that is, (1, 6, 3, 4, 5, 2, 7, 8). The effect of the interleaving is that only the codeword elements in the 2nd dimension are exchanged, and the positions of the codeword elements in the remaining dimensions are unchanged.

To this end, the interleaver available for the user equipment UE2 is implemented.

4-3. Interaction of Information on Interleaver Configuration IOI

After the respective interleaver is implemented based on the SCMA codebooks of different user equipments, information about the interleaver configuration needs to be interacted between the transmitting and the receiving sides. For example, in the case of the uplink transmission, if the interleaver of individual user equipment is implemented in the control device, the information on interleaver configuration IOI is required to be imparted to individual user equipment, and the user equipment can configure the interleaver in the transmitter according to the individual information on interleaver configuration. Any one of the interleavers can be represented by a corresponding interleaved sequence. Therefore, the interleaved sequence contains all of the information on the corresponding interleaver. In one example, the information on interleaver configuration can be interacted by way of transmitting an interleaved sequence.

However, since the length of the interleaved sequence is QK, the transmission of the interleaved sequence requires a significant signaling overhead, which is undoubtedly burdensome for the actual wireless communication network. Therefore, in another example, a plurality of pre-implemented interleavers may be stored in advance in the control device and the user equipment, and the suitable interleaver is then selected from the plurality of stored interleavers by the control device according to the SCMA codebook for use, which can reduce the signaling overhead to a great extent. In this example, the information on interleaver may include an identification number of the interleaver, for example, in the case where different types of numbered interleavers have been stored in advance for the results of different codebook design, only the identification number of the interleaver may be interacted. Alternatively, it may further include an interleaving criterion, such as an interleaving criterion 1 or an interleaving criterion 2; a category of the interleaver, such as an interleaver based on a random sub-interleaver or an interleaver based on a non-overlapping sub-interleaver. The choice of the interleaving criteria depends on the SCMA information on codebook and directs the subsequent selection of the interleaver. The identification number of the interleaver is an identification number of the interleavers which conform to the same interleaving criteria and belong to the same category.

The number Q of the codewords participating in the interleaving has a certain range of values. The lower limit is related to the overlapped dimension between different user equipments, and the more the overlapped dimension is, the higher the minimum number of the codewords required to participate in the interleaving is. The upper limit depends on the tolerance delay of the user service, and the shorter the tolerance delay is, the less the maximum number of the codewords participating in the interleaving is. It is considered that the interleaver designed herein is generated mostly based on a random interleaver. For a random interleaver, the more the number of the symbols participating in the interleaving is, the better the randomness is, the more the correlation among the user equipments during SCMA can be reduced, and the better the system performance is. Therefore, from this perspective, Q should be chosen to be the maximum value within the range of values to achieve the best performance. In addition, a real-time interaction of the number Q of the codewords participating in the interleaving will increase the signaling overhead, thus the number Q of the interleaved codewords can be pre-configured before the transmission system is established.

4-4. SCMA Detector According to Implementation Example 1

As described above, the device on the receiving side, for example, the electronic device 300, configures the SCMA detector, for example, the detection unit 605, based on the information on codebook ICB and the information on interleaver configuration IOI of the user equipment, so as to detect the codeword data of the respective user equipment. In one example, the device on the receiving side utilizes the determined information on codebook ICB and the information on interleaver configuration IOI to jointly detect the received signal, that is, directly performs a detection on the signals received on the plurality of time domain units as a whole, instead of a sequential detection of the signal received on a single time domain unit.

In one example, the detector generates a joint factor graph matrix based on the information on codebook and the information on interleaver configuration, and performs the detection, for example, an MPA detection, using the generated joint factor graph matrix. In this sense, the joint factor graph matrix can be considered as a resource allocating parameter in the extended codebook. Algorithm for generation of the joint factor graph matrix, for example, can be:

1) recovering the interleaver configuration of each user equipment represented by an interleaved sequence, with the length being QK, based on the information on interleaver configuration of each user equipment;

2) forming a QK×QJ-dimensional uninterleaved joint factor graph matrix, for example, the matrix on the left in FIG. 5D, according to the K×J-dimensional factor graph matrix in the information on codebook and the number Q of the interleaved codewords;

3) selecting, for the user equipment j (1≤j≤J), the columns (Q columns in total) corresponding to the user equipment in the uninterleaved joint factor graph matrix: the jth column, the (j+J)th column, the (j+2J)th column, . . . , the j+(Q−1)Jth column. The Q columns respectively represent the Q codewords of the user equipment j, and those columns are extracted to form sequentially a QK×Q-dimensional matrix;

4) performing the interleaving row by row on the QK×Q-dimensional matrix based on the interleaved sequence with a length of QK;

5) substituting, column by column, the corresponding columns in the uninterleaved joint factor graph matrix for the interleaved QK×Q-dimensional matrix;

6) repeating 3), 4), and 5), until the above operations are completed for all user equipment. The QK×QJ-dimensional matrix at present is the required joint factor graph matrix.

Based on the joint factor graph matrix, the received signal, and the channel state information, the MPA detector can separate well the data of different user equipments from each other. At the same time, it can be realized that the interleaving operation does not increase the number of user equipments overlapped in the same dimension, so the complexity of the MPA detector will not be increased.

The various aspects of the implementation example 1 of the first embodiment of the present disclosure have been described above, such as the 1st type of I-SCMA system structure, the interleaver design, the interaction of information on interleaver configuration, the detector, and the like. Although other aspects are not described in detail, they can be understood by those skilled in the art after reading other parts of the disclosure.

5. Implementation Example 2 According to the First Embodiment

Another implementation example of the first embodiment will be as described below, and features different from the implementation example 1 will be explained primarily, and other features which are not described in detail can be understood with reference to the implementation example 1 in the case of enablement.

5-1. I-SCMA System According to Implementation Example 2

Figure 13:
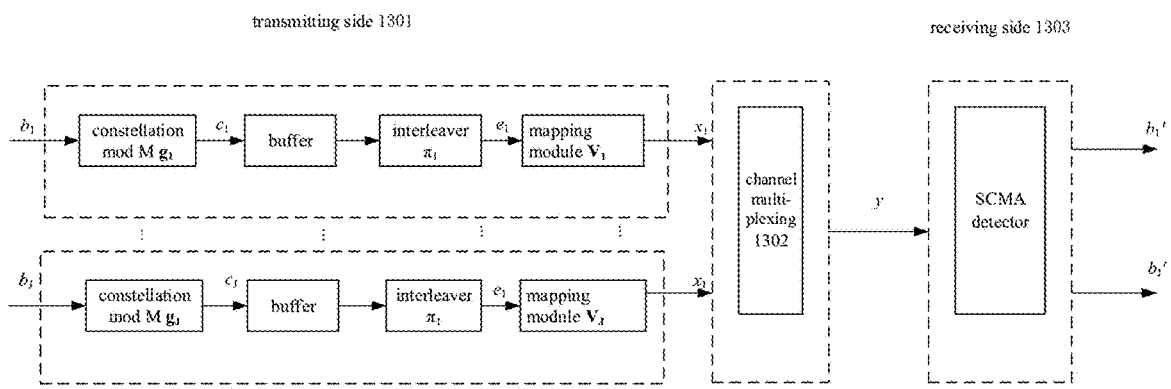
FIG. 13 is a structural block diagram illustrating a 2nd type of I-SCMA system according to an implementation example of the present disclosure.

FIG. 13 is the block diagram illustrating the I-SCMA system according to the implementation example 2 of the present disclosure. Similar to the 1st type of I-SCMA system described with reference to FIG. 11, the transmitting side portion 1301 of the SCMA system according to the implementation example 2 also includes a buffer and an interleaver. The difference therebetween is that the buffer and the interleaver are located between the constellation modulation module and the mapping matrix module in the SCMA encoder instead of subsequence thereto. Hereinafter, an I-SCMA system having such configuration will be referred to as a 2nd type of I-SCMA system. The description of the same portions as those in FIG. 11 will be omitted.

It is also assumed that there are J user equipments which are required to transmit data. The bit data information $b_1, \ldots, b_J$ of the J user equipments will be input to the individual transmitters, respectively, and SCMA encoded by the respective SCMA encoder. For the user equipment $j \in 1, \ldots, J$, the bit data information $b_j \in \mathbb{B}^{\log M}$ thereof is modulated into an N-dimensional complex symbol $c_j$ firstly by the N-dimensional constellation modulation module $g_j$ in the respective SCMA encoder.

Rather than a high-dimensional mapping being performed directly, the bit data information $b_j$ is buffered in the buffer to wait for the generation of other N-dimensional complex symbols after being modulated into the N-dimensional complex symbol $c_j$. When there are Q N-dimensional complex symbols $c_j^1, c_j^2, \ldots, c_j^Q$ in the buffer, where Q is a predetermined or pre-configured positive integer and Q≥2, those N-dimensional complex symbols are interleaved by the respective interleaver $\pi_j$, to obtain a QN-dimensional complex joint symbol $e_j$. The interleavers $\pi_j$ for different user equipments are different from each other. The QN-dimensional complex joint symbol $e_j$ can be regarded as a serial concatenation of Q N-dimensional symbols (unlike the N-dimensional complex symbol $c_j$, the N-dimensional symbols here are only consecutive N consecutive symbols in the interleaved symbol sequence). The QN-dimensional complex joint symbol $e_j$, i.e., Q N-dimensional symbols, is input to the mapping matrix module. The mapping matrix module performs an operation of mapping the N-dimensional symbols into K-dimensional codewords, and performs the mapping sequentially for Q times, until the QN-dimensional complex joint symbol $e_j$ is mapped into a QK-dimensional complex joint codeword $x_j$.

Then, the complex joint codeword $x_j$ obtained by the interleaving is transmitted to the receiving side. The QK-dimensional complex joint codewords $x_1, \ldots, x_J$ of the J user equipments are transmitted through the same set of transmission resources in Q time domain units, for example, Q time slots, and superimposed into the overlapped signal containing data information of the J users after a channel multiplexing. The SCMA on the receiving side receives the overlapped signal y. Based on the a priori information, such as the information on codebook, the channel state, and the information on interleaver, etc. on individual user equipment, the MPA detector on the receiving side detects the overlapped symbols and generates detected bits $b'_1, \ldots, b'_J$.

Unlike the above-mentioned 1st type of I-SCMA system for interleaving directly the sparse codewords generated via the SCMA encoder, the 2nd type of I-SCMA system achieves the interleaving for at least two codewords by interleaving firstly at least two of the high-dimensional, non-sparse symbols modulated by the constellation and then mapping the interleaved symbols into the sparse codewords. Although the order by which the interleaving and the mapping are performed is reversed, the transmitting side portions of the 1st and 2nd types of I-SCMA systems generate the same Q K-dimensional sparse codewords, that is, although the operation sequence is different therefrom, the resulting high dimensional codewords are the same. Therefore, in this sense, the 2nd type of I-SCMA system is also a system for interleaving, transmission and detection of multi-codeword, and is a long spread/interleaving based system.

Similar to the 1st type of I-SCMA system, the SCMA detector, such as the MPA detector, used by the 2nd type of I-SCMA system performs the detection based on information on the interleaver used on the transmitting side (information on interleaver configuration IOI), in addition to the information on codebook, and the channel state.

5-2. Interleaver According to Implementation Example 2

On the transmitting side portion of the 2nd type of I-SCMA system, the interleaver is subsequent to the constellation modulation module and prior to the mapping matrix module. Therefore, the input to the interleaver is Q N-dimensional complex signals $c_j^1, c_j^2, \ldots, c_j^Q$. Those N-dimensional complex signals are not sparse, i.e., there is no dimension where the element is zero.

It is desired that the interleaver does not damage the difference between the codebooks designed for the user equipments while performing the interleaving operation. Therefore, the applicable interleaver can be implemented based on the interleaving criteria 1 and 2 described above. An exemplary implementation of an interleaver suitable for a 2nd type of I-SCMA system is described below.

5-2-1. Interleaver Implementation (Design) Based on Interleaving Criterion 1

Since the input to the interleaver is Q non-sparse N-dimensional complex symbols, the Q N-dimensional complex signals can be directly interleaved. For J user equipments, the algorithm for implementation of J different interleavers are as follows:

1) interleaving randomly the Q N-dimensional complex signals $c_j^1, c_j^2, \ldots, c_j^Q$ input to the interleaver for the user equipment j (1≤j≤J); and 2) repeating 1), until all random interleavers of user equipment are generated, the random interleavers of different user equipments being different from each other, and the length of the interleaver being QN.

The J interleavers implemented according to the above examples can scramble the symbol elements in the overlapped dimensions of the user equipment with a high probability, especially when the number Q of interleaved codewords is large.

5-2-2. Interleaver Implementation Based on Interleaving Criterion 2

In the 2nd type of I-SCMA system, the interleaving is performed firstly, followed by the high-dimensional mapping, and the input to the interleaver is Q N-dimensional complex symbols. It is assumed that the interleaving occurs in the same dimension of different N-dimensional complex symbols. In that case, after the mapping by the mapping matrix module, the interleaving also occurs only in the same dimension of different codewords, and also conform to the interleaving criterion 2 accordingly.

As a first exemplary method for implementation, an implementation of an interleaver for J user equipments is as follows:

1) generating JN different sub-interleavers with a length of Q, the sub-interleavers may be random interleavers, and may also be non-overlapping interleavers (such as shift interleavers);

2) allocating N sub-interleavers for the user equipment j ($1 \leq j \leq J$) for the interleaving of a plurality of complex symbols in the same dimension, and combining alternately the N sub-interleavers (for example using the algorithm for alternate combination as described above) to form an interleaver $\pi_j$; and 3) repeating 2), until the interleavers of all user equipments are generated.

The method for implementation of the interleaver according to this example is applicable to the case where Q is relatively large. For J user equipments, a total of JN different sub-interleavers are required to be allocated, so the above method for implementation requires a sufficient number of sub-interleavers to be generated. When Q is small, JN different sub-interleavers may be failed to be generated. For example, when J=4, K=4, N=3, and Q=2, since the length of the sub-interleaver is 2, there are only two types of different sub-interleavers, and the number of the sub-interleavers required at that time is 12.

To this end, it is proposed a second exemplary method for implementation which reducing the required number of sub-interleavers to a greater extent by allocating rationally the sub-interleavers, and has more adaption. The method for implementation is as follows:

1) generating a plurality of different sub-interleavers with a length of Q, of which the identification numbers are 1, 2, 3 . . . , and the sub-interleaver may be a random interleaver or a non-overlapping interleaver.

2) allocating the sub-interleavers to the non-zero dimensions occupied by individual user equipments based on the mapping matrix, which is equivalent to an allocation of the sub-interleavers to N dimensions of the N-dimensional complex signal;

i. using the sub-interleaver 1 in individual non-zero dimensions for the 1st column in the mapping matrix F, that is, the user equipment 1;

ii. using the sub-interleaver 1 in individual non-zero dimensions for the jth column ($j \geq 2$) in the mapping matrix F, and observing the number of overlapped dimensions with all previous columns, the same dimension using different sub-interleavers being considered not to be overlapped;

iii. jumping to the (j+1)th column, if the overlapped dimensions with all previous columns are not greater than 1; considering the overlapped dimensions greater than 1 should use different sub-interleavers, if the number of overlapped dimensions with any of the previous columns is greater than 1, traversing sequentially the sub-interleaver 2, the sub-interleaver 3 . . . until the overlapped dimension is not greater than 1; and iv. repeating ii., iii., until j=J, the sub-interleavers have been allocated in the non-zero dimensions occupied by all user equipments; and 3) performing an alternate combination according to the N sub-interleavers allocated to each user equipment using the algorithm for the alternate combination as described above to form a respective interleaver. The algorithm for the alternate combination is substantially consistent with that described in the previous section 4-2-2, except that the dimensions required to be alternately combined here are N dimensions.

5-3. Interaction of Information on Interleaver Configuration

After the respective interleaver is implemented based on the SCMA codebooks of different user equipments, information about the interleaver configuration may be interacted between the transmitting and the receiving sides. The information on interleaver configuration may include an identification number of the interleaver, or may include an interleaving criterion, such as an interleaving criterion 1 or an interleaving criterion 2; a category of the interleaver. The information on interleaver configuration may also be other types of information, as long as the interleaver configuration can be obtained by both the transmitting and the receiving sides.

The interleaver employed by the 2nd type of I-SCMA system is substantially the same as that employed by the 1st type of I-SCMA system, except that the non-sparse complex symbols are interleaved. Therefore, the information on interleaver configuration can be interacted similarly between the transmitting and the receiving sides, which will not be described in detail herein.

5-4. SCMA Detector According to Implementation Example 2

As described above, the device on the receiving side, for example, the electronic device 300, configures the SCMA detector, for example, the detection unit 605, based on the information on codebook ICB and the information on interleaver configuration IOI of the user equipment, so as to detect the codeword data of the respective user equipment.

In one example, the detector generates a joint factor graph matrix based on the information on codebook and the information on interleaver configuration, and performs the detection, for example, the MPA detection, using the generated joint factor graph matrix. In this sense, the joint factor graph matrix can be considered as a resource allocating parameter in the expanded codebook. The algorithm for generating the joint factor graph matrix is as follows:

1) recovering the interleaver of each user equipment represented by an interleaved sequence, with the length being QK, based on the information on interleaver configuration of each user equipment;

2) forming a QK×QJ-dimensional uninterleaved joint factor graph matrix, for example, the matrix on the left in FIG. 5D, according to the K×J-dimensional factor graph matrix and the number Q of the interleaved symbols;

3) selecting, for the user equipment j ($1 \leq j \leq J$), the columns (Q columns in total) corresponding to the user equipment in the uninterleaved joint factor graph matrix: the jth column, the (j+J)th column, the (j+2J)th column, . . . , the j+(Q−1)Jth column. The Q columns respectively represent the Q codewords of the user equipment j, and those columns are extracted to form sequentially a QK×Q-dimensional matrix, and then the rows in which the all elements are 0s of that matrix are deleted to obtain the QN×Q-dimensional matrix;

4) performing the interleaving row by row on the QK×Q-dimensional matrix based on the interleaved sequence with a length of QK;

5) filling the rows in which the elements of 0s are deleted in 3) in the original positions to re-form the QK×Q-dimensional matrix for the interleaved QN×Q-dimensional matrix;

6) substituting, column by column, the corresponding columns in the uninterleaved joint factor graph matrix for the re-formed QK×Q-dimensional matrix; and 7) repeating 3), 4), and 5), until the above operations are completed for all user equipment. The QK×QJ-dimensional matrix at present is the required joint factor graph matrix.

Based on the joint factor graph matrix, the received signal, and the channel state information, the MPA detector can separate well the data of different user equipments from each other.

The various aspects of the implementation example 2 of the first embodiment of the present disclosure have been described above, such as the 2nd type of I-SCMA system structure, the interleaver design, the interaction of information on interleaver configuration, the detector, and the like. Although other aspects are not described in detail, they can be understood by those skilled in the art after reading other parts of the disclosure.

It is to be noted that although in the implementation examples 1 and 2, the operations of constellation modulation, the mapping, and the interleaving are performed separately, those operations may also be performed in combination. For example, the operation of constellation modulation may be combined with the operation of interleaving, or the operation of interleaving may be combined with the operation of mapping, or may be performed in other combinations.

6. Second Embodiment of the Present Disclosure

In the first embodiment described above, the overlapped dimension between the codewords e.g., the codewords 1 or 2 of UEs 1 and 2, on the same time domain unit or between the codewords on different time domain units e.g., the codeword 1 of the UE1 and the codeword 2 of the UE2, of different user equipments is made not more than 1 by performing the interleaving on a plurality of codewords of the same user equipment (for example, directly interleaving the sparse codeword, or interleaving firstly the non-sparse symbol and mapping then into sparse codewords), thereby reducing the correlation between different user equipments during SCMA.

In the second embodiment, the interference is no longer dispersed by the interleaving, but the expanded set of transmission resources is utilized to reduce the correlation between different equipments.

Figure 14:
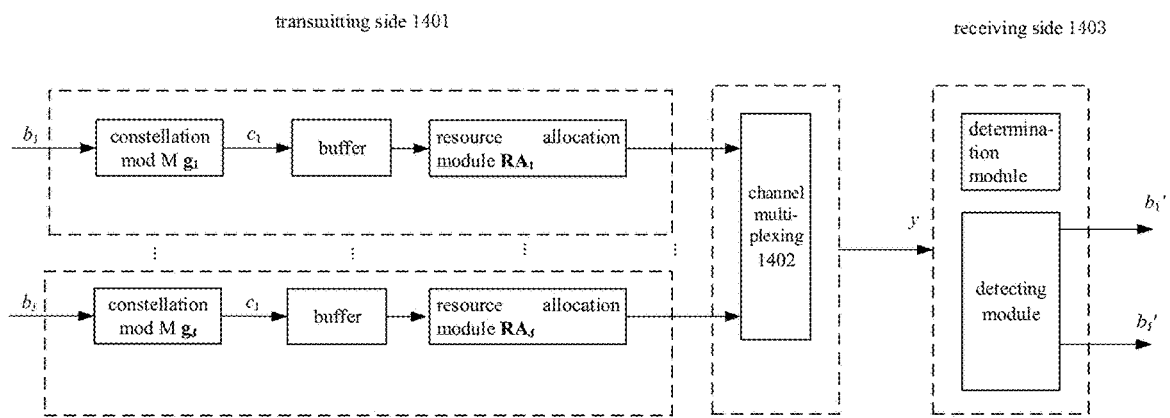
FIG. 14 is a structural block diagram illustrating an SCMA system according to a second embodiment of the present disclosure.

FIG. 14 is the block diagram illustrating the SCMA system according to the second embodiment. As shown in FIG. 14, the SCMA system may include a transmitting side portion 1401, a channel multiplexing portion 1402, and a receiving side portion 1403. The transmitting side portion 1401 may include constellation modulation modules $g_1 \sim g_J$, a buffer module, and resource allocation modules $RA_1 \sim RA_J$, and the receiving side portion 1403 may include a determination module and a detection module.

It is assumed as well that there is data of J user equipments required to be transmitted through a set of transmission resources. The bit data information $b_1, \ldots, b_J$ of the J user equipments will be input to the individual transmitters, respectively. For the user equipment $j \in 1, \ldots, J$, firstly, the bit data information thereof $b_j \in \mathbb{B}^{\log M}$ is high-dimensionally modulated by the N-dimensional constellation modulation module into an N-dimensional complex symbol $c_j$; rather than a high-dimensional mapping being performed directly, the bit data information $b_j$ is buffered in the buffer to wait for the generation of other N-dimensional complex symbols after being modulated into the N-dimensional complex symbol $c_j$. When there are Q N-dimensional complex symbols $c_j^1, c_j^2, \ldots, c_j^Q$ in the buffer, where Q is a predetermined or pre-configured positive integer and Q≥2, those Q complex symbols are concatenated serially and then input into the resource allocation module for the resource mapping. The resource allocation module may be configured to extend the set of transmission resources onto the Q time domain units to obtain an expanded set of transmission resources, and map the concatenated Q N-dimensional complex symbols to one QK-dimensional complex joint codeword $x_j$ according to the resource allocating parameter, and the complex joint codeword is sparse because QK>QN. Where the resource allocating parameter indicates the transmission resources occupied respectively by the Q complex symbols of the user equipment j in the expanded set of transmission resources, so that the transmission resources occupied by the Q complex symbols are different from each other.

Then, the J complex joint codewords of the J user equipments are transmitted over the same set of transmission resources in plurality of time domain units, and are superimposed into an overlapped signal after a channel multiplexing. The receiving side portion receives the overlapped signal y. The determination unit of the receiving side portion determines an SCMA expanded codebook of the J user equipments, where the expanded codebook includes resource allocating parameters of the user equipment on the expanded set of transmission resources. The detection module of the receiving side portion detects the received signal and generates detected bits $b'_1, \ldots, b'_J$ of the respective user equipment based on a priori information such as the information on expanded codebook and/or the channel state, etc. of individual user equipment.

As compared with the known SCMA system described with reference to FIG. 1A, the SCMA system according to the second embodiment performs the resource mapping and the detection using an expanded codebook including the resource allocating parameter on the expanded set of transmission resources.

Such expanded set of transmission resources and resource allocating parameter are described in detail as below with reference to FIG. 15. An example of resource allocating parameter for Q symbols for J user equipments is shown in FIG. 15 in the form of a factor graph matrix, with an assumption of J=4, K=4, N=3, and Q=2.

The rows in the factor graph matrix represent the expanded set of transmission resources, each row representing a single transmission resource in the expanded set of transmission resources, such as the subcarriers of different time domain units. As shown in FIG. 15, the expanded set of transmission resources includes a set of transmission resources, for example, K subcarriers, of 2 time domain units, thereby having 8 dimensions.

Each column in the factor graph matrix represents the occupancy of each N-dimensional symbol of each user equipment on the transmission resource in the expanded set of transmission resources, wherein the left and right halves of the matrix correspond respectively to the mappings of the 1st and 2nd symbols of each user equipment. For example, the transmission resource parameter of the user equipment UE2 are highlighted in FIG. 15. Specifically, the 1st symbol of the user equipment UE2 occupies the 1st, 4th, and 6th dimensions in the expanded set of transmission resources, and the 2nd symbol occupies the 2nd, 5th, and 8th dimensions. Therefore, the Q symbols of the user equipment UE2 occupy different transmission resources.

Figures 15, 16:
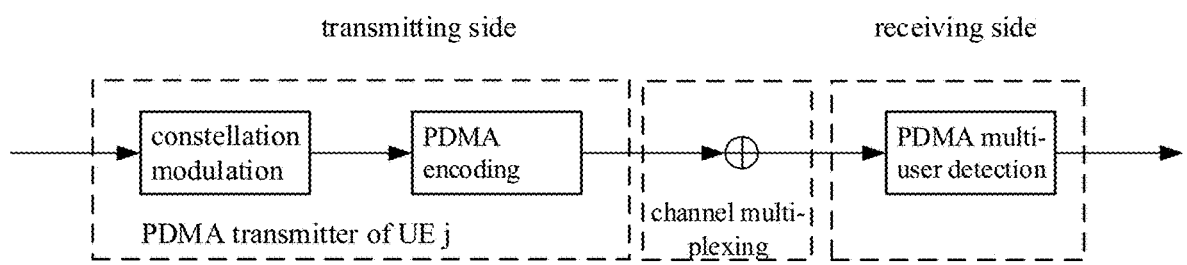
FIG. 15 is a diagram illustrating an expanded codebook according to the second embodiment of the present disclosure.
FIG. 16 is a structural block diagram illustrating a known PDMA system.

As can be seen from FIG. 15, the dimension by which any two columns in the factor graph matrix are overlapped is not more than 1, which means that the number by which transmission resources occupied by the symbols of any two user equipments are overlapped is not above 1. Therefore, when the resource allocation module performs a resource mapping of a plurality of user equipments based on the factor graph matrix, a correlation among the plurality of user equipments during SCMA can be effectively reduced.

Such resource allocating parameter represented by the expanded factor graph matrix is able to be implemented by the control device in accordance with a predetermined algorithm. For example, the control device can use a heuristic algorithm to determine:

1) adding a new column of the factor graph matrix each time starting at the first column, and the number of non-zero elements of each column is equal to the number N of dimensions, so that the overlapping between the non-zero elements of the previous column is not more than 1;

2) deciding whether the addition of the new column is completed, that is, whether the number of non-zero elements reaches N. If not, return to step 1) to continue to add the next element of the column; and if so, proceed to step 3); and 3) deciding whether the construction of the factor graph matrix is completed, that is, whether the JQth column is completed. If not, return to step 1) to continue to add the elements of the next column, until the construction of the factor graph matrix is completed.

However, the control device may also determine the factor graph matrix based on an algorithm other than the heuristic algorithm. For example, in the case where the number N of dimensions and the number K of available resources are small, the number by which the user equipments of individual transmission resource are overlapped and the difference between the mapping matrices of individual user equipments in each case may be compared based on the exhaustive search algorithm, that is, traversing all possible factor graph matrices, and a set of mapping matrices in which the number by which the user equipments are overlapped is the smallest and the difference between the mapping matrices of the individual user equipments is the largest is taken as the optimal factor graph matrix F.

The determination module of the receiving side portion 1403 may determine information about the expanded codebook, for example, determine the expanded factor graph matrix. When the receiving side is a control device, the determination module can obtain directly the information on expanded codebook as a result of the design of the factor graph matrix by the control device. When the receiving side is a user equipment, the determination module may obtain the information on expanded codebook through an interaction of information between the user equipment and the control device.

The detection module of the receiving side portion 1403 performs detection for the signal received on the expanded set of transmission resources according to the information on expanded codebook, e.g., the expanded factor graph matrix, determined by the determination module to obtain data of the respective user equipment. Since the number by which the elements in any two columns in the expanded factor graph matrix are overlapped is not above 1, there is no 4-side-circle structure in the receiver factor graph corresponding to the factor graph matrix. Therefore, the interference between the user equipments is dispersed, and the performance of the system is improved.

7. Extended Embodiment of the Present Disclosure

The first and second embodiments have been described above by taking SCMA as an example. However, various aspects discussed on SCMA can also be applied to other techniques of non-orthogonal-resource based multiple access, such as PDMA.

PDMA distinguishes the user equipments by non-orthogonal feature patterns of plurality of signal domains, such as a power domain, a space domain, and a coding domain, and uses a multi-user equipment detection structure based on Serial Interference Cancellation (SIC) on the receiving side to achieve a quasi-optimal multi-user equipment reception. The non-orthogonal feature patterns allocated to individual user equipments are similar to a set of transmission resources that are non-orthogonal between different user equipments allocated for the user equipments in SCMA.

FIG. 16 shows the PDMA process of, for example, the user equipment j. The input data $b_j \in \mathbb{B}^{\log M}$ of the user equipment j is modulated firstly by the QAM constellation into a one-dimensional QAM symbol $c_j$. The QAM symbol is then pattern mapped in a PDMA encoder using a PDMA pattern matrix to obtain a K-dimensional (possibly sparse or possibly not sparse) PDMA codeword $d_j$. Thereafter, the signals of the J user equipments are multiplexed in the channel, and the K-dimensional overlapped codeword y is received by the receiving side. The receiving side can use a SIC algorithm or a BP (Brief Propagation) algorithm for the multi-user detection. The complexity of the BP algorithm is higher than that of the SIC algorithm, but it can achieve better demodulation performance. The demodulation process of the BP algorithm can also be represented by a factor graph.

The digital baseband model in a PDMA system is (assuming an ideal channel):

$$\begin{pmatrix} y_1 \\ y_2 \\ \cdots \\ y_K \end{pmatrix} = G_{PDMA}^{[K,J]} \begin{pmatrix} c_1 \\ c_2 \\ \cdots \\ c_J \end{pmatrix} + \begin{pmatrix} n_1 \\ n_2 \\ \cdots \\ n_K \end{pmatrix}$$

where $G_{PDMA}^{[K,J]}$ is a K×J-dimensional PDMA pattern matrix, and the design of $G_{PDMA}^{[K,J]}$ affects the performance of the PDMA system to a significant extent.

It is considered a simple design of the PDMA pattern matrix, for example for J=6, and K=3:

$$G_{PDMA}^{[3,6]} = \begin{pmatrix} 1 & 1 & 1 & 0 & 1 & 0 \\ 1 & 1 & 0 & 1 & 0 & 1 \\ 1 & 0 & 1 & 1 & 0 & 0 \end{pmatrix}$$

where each column in the matrix represents a non-orthogonal feature pattern (consisting of 3 dimensions) of one user equipment. Each user equipment extends its own QAM signal duplicate to one or more dimensions, which is equivalent to using the same constellation in those dimensions. For example, the user equipment 2 (the column 2) performs a transmission of the same QAM signal in the 1st and 2nd dimensions. In that case, there are many similarities between the PDMA pattern design and the SCMA codebook design 1 described in the first embodiment.

Figure 17:
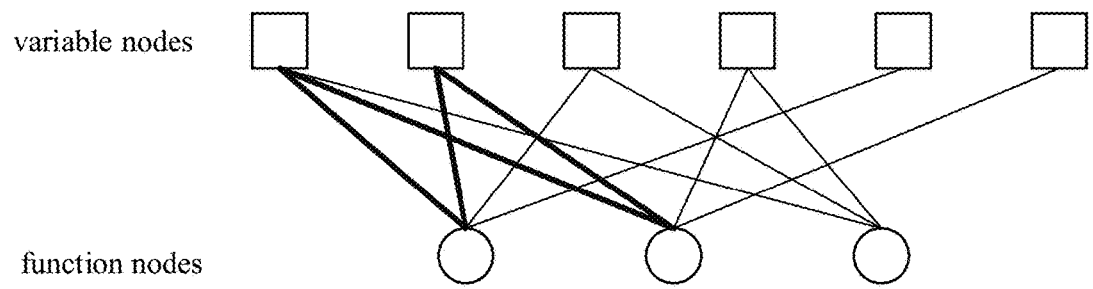
FIG. 17 is a diagram illustrating a receiver factor graph of the known PDMA system.

As can be seen from the above PDMA pattern matrix $G_{PDMA}^{[3,6]}$, there is a case where the overlapped dimension between different user equipments is greater than 1. When detecting by the BP algorithm on the receiving side, such overlapping demonstrates that there is a 4-side-circle structure in the factor graph of the BP algorithm. FIG. 17 shows an example of a factor graph when the detection is performed using the BP algorithm on the receiving side of the PDMA. As shown by the bold line in FIG. 17, there is a 4-side-circle structure in the factor graph. That 4-side-circle structure is possible to affect the detection accuracy of the receiving side as well.

In order to break that 4-side-circle structure, the concept proposed above for SCMA can be applied to PDMA.

In one embodiment, an interleaving operation can be introduced during PDMA. In PDMA, the gain of the PDMA pattern is reflected primarily in that the different non-zero dimensions are occupied by different user equipments. In order to sustain the main gain of the PDMA pattern while breaking the 4-side-circle structure, it is necessary to design an interleaving operation based on a PDMA codebook, for example, a PDMA pattern matrix.

As described above, the pattern matrix $G_{PDMA}^{[3,6]}$ exemplified above is similar to the SCMA codebook design 1 as described in the first embodiment. Therefore, the interleaving criterion 1 can be used similarly: the interleaving operation only occurs in the non-zero dimension of the different PDMA codewords of the same user equipment, and the dimension in which the elements are 0s is not interleaved. That interleaving method does not change the non-zero dimensions occupied by individual user equipments, thus the main gain of the PDMA pattern design can be sustained, and meanwhile, the interleaving can break the 4-side-circle structure in the receiver and disperse the interference, thereby improving the performance of the PDMA system.

It is considered another more complicated design of the PDMA pattern matrix: the non-zero elements in $G_{PDMA}^{[3,6]}$ are not just 1 any longer, but $\alpha_{k,j}e^{-j\varphi_{k,j}}$, $\alpha_{k,j}e^{-j\varphi_{k,j}}$, representing a phase rotation $\varphi_{k,j}$ and the amplitude adjustment $\alpha_{k,j}$ of the constellation of user equipment in the kth dimension, which are equivalent to the usage of different constellations by the user equipment in different dimensions. At this time, the gain of the PDMA pattern is not only originated from the non-zero dimensions occupied by individual user equipments, but also from the difference between the constellations of the different dimensions and the different user equipments. The difference between the constellations is reflected by the phase rotation $\varphi_{k,j}$ and the amplitude adjustment $\alpha_{k,j}$.

That PDMA pattern design is similar to the SCMA codebook design 2 as described in the first embodiment. Thus, interleaving criterion 2 can be similarly used: the interleaving operation only occurs in the same non-zero dimension of the different PDMA codewords of the same user equipment. Firstly, that interleaving operation does not change the non-zero dimensions occupied by individual user equipments; secondly, since the constellations of the same dimension of the different PDMA codewords are the same, an exchange of the elements in the same non-zero dimension of different codewords will not change the difference between constellations of different user equipments in overlapped dimensions. Therefore, that interleaving operation can sustain the main gain of the PDMA pattern design, and further improve the system performance based thereon by breaking the 4-side-circle structure and dispersing the interference.

Figure 18:
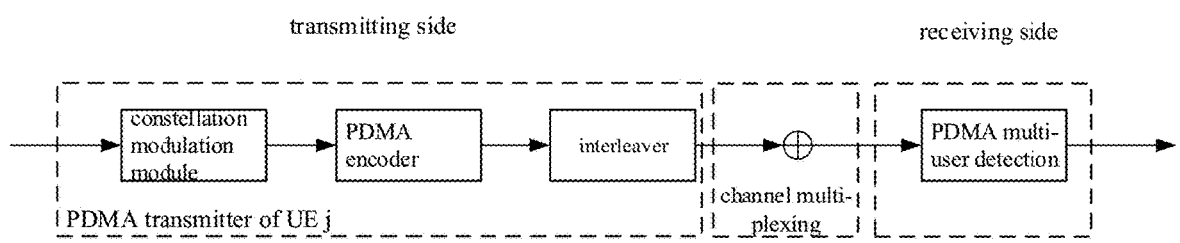
FIG. 18 is a structural block diagram illustrating a PDMA system according to an additional embodiment of the present disclosure.

Therefore, in the PDMA system, an interleaver that performs an interleaving operation on a PDMA codeword can be implemented by conforming selectively to the interleaving criterion 1 or the interleaving criterion 2 based on the PDMA information on codebook. FIG. 18 shows a block diagram of an improved PDMA system. The improved PDMA system also includes an interleaver on the transmitting side as compared with the known PDMA system shown in FIG. 16. The interleaver is configured to perform an interleaving operation on at least two codewords generated by the PDMA encoder to reduce the correlation among different user equipments.

The multi-user detection module in the receiving side is required to be changed correspondingly. Since the BP detection algorithm and the MPA detection algorithm are similar in nature, i.e., the multi-user equipment detection is realized by an iterative log likelihood ratio between the variable node and the function node, the BP detection module in the receiving side of the improved PDMA system performs detection according to the information on codebook and the information on interleaver configuration. In one example, the detection module can generate a joint pattern matrix based on the pattern matrix and information on interleaver configuration and perform the detection using the generated joint pattern matrix.

Although an operation in which the interleaver and the joint pattern matrix are generated in the PDMA system is not described in detail in the present embodiment, it can be implemented by those skilled in the art similarly based on the method for implementation of the interleaver and the method for implementation of the joint pattern matrix for the SCMA system as described above.

In another embodiment, the inter-interleaving operation may not be introduced, but the correlation among the user equipments may be reduced by expanding the set of transmission resources and determining the resource allocating parameters of individual user equipments on the expanded set of transmission resources, which is similar to that as described for SCMA in the second embodiment.

For example, when designing the PDMA codebooks of the plurality of user equipments, the control device expands the set of transmission resources to a plurality of time domain units to obtain an expanded set of transmission resources, and determines the expanded PDMA pattern matrix, for example, by an algorithm such as a heuristic algorithm, an exhaustive search method, and the like, such that the overlapped dimension between the columns of the PDMA pattern matrix is not more than 1. The PDMA encoder can then be configured to utilize the expanded PDMA pattern matrix to resource map a plurality of QAM symbols for individual user equipments. Correspondingly, on the receiving side, a PDMA multi-user detector, e.g., a BP detector, performs the detection using an expanded PDMA pattern matrix.

Thus, the various embodiments and examples described with reference to SCMA are also applicable to PDMA systems, thereby breaking the 4-side-circle structure in known PDMA systems, which both reduces the correlation during PDMA and preserves the main performance gain of the known PDMA, thereby improving the system performance. Based on similar concepts, the various embodiments and examples described in the present disclosure are also applicable to other systems of non-orthogonal-resource based multiple access and achieve similar performance improvements.

8. Application Example of the Present Disclosure

Technology described in the present disclosure is applicable to various products.

The electronic device 200 on the transmitting side may be implemented as the control device or the user equipment, and the electronic device 600 on the receiving side may be implemented as the user equipment or the control device.

For example, the user equipment may be implemented as a mobile terminal such as a smartphone, a tablet personal computer (PC), a notebook PC, a portable game terminal, a portable/dongle type mobile router, and a digital camera apparatus, or an in-vehicle terminal such as a car navigation device. The user equipment may also be implemented as a terminal that performs machine-to-machine (M2M) communication (which is also referred to as a machine type communication (MTC) terminal). Furthermore, the user equipment may be a wireless communication module (such as an integrated circuit module including a single die) mounted on each of the above terminals.

For example, the control device may be implemented as any type of evolved Node B (eNB) such as a macro eNB, and a small eNB. A small eNB may be an eNB that covers a cell smaller than a macro cell, such as a pico eNB, micro eNB, and home (femto) eNB. Instead, the electronic device 300 on the side of control device may be implemented as any other types of base stations such as a NodeB and a base transceiver station (BTS). The control device may include a main body (that is also referred to as a base station device) configured to control wireless communication, and one or more remote radio heads (RRH) disposed in a different place from the main body.

8-1. Applications Related to Control Device

It should be understood that the term base station in the present disclosure has the complete breadth of its ordinary meaning and includes at least a wireless communication station that is used as part of a wireless communication system or radio system to facilitate communication. Examples of the base station may be, for example but not limited to, the following: the base station may be one or both of a base transceiver station (BTS) and a base station controller (BSC) in the GSM system, and may be one or both of a radio network controller (IOIC) and NodeB in the WCDMA system, may be eNBs in LTE and LTE-Advanced systems, or may be corresponding network nodes in future communication systems, e.g., gNBs that may appear in 5G communication systems, etc. In the scenarios of D2D, M2M, and V2V communications, a logical entity that has control functions for communication may also be referred to as a base station. In a scenario of cognitive radio communication, a logical entity that acts as a spectrum coordination function can also be referred to as a base station.

First Application Example

Figure 19:
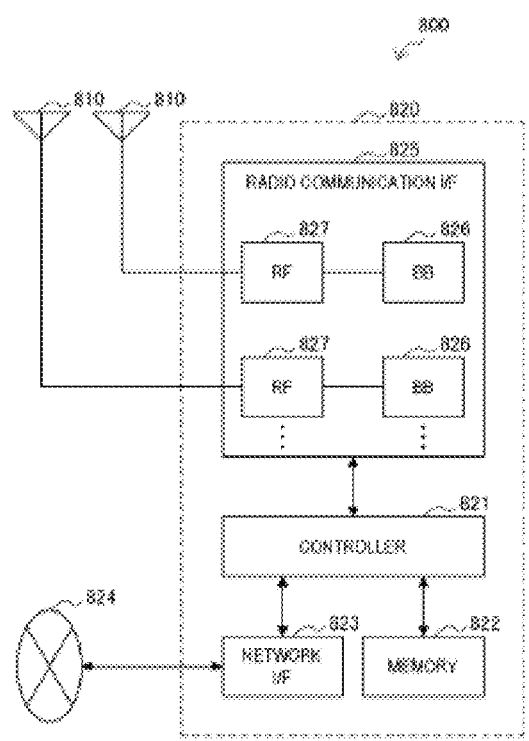
FIG. 19 is a block diagram illustrating a first example of a schematic configuration of a control device according to the embodiment of the present disclosure.

FIG. 19 is a block diagram illustrating a first application example of a schematic configuration of the control device to which a technology as described in the present disclosure may be applied. In this Figure, the control device may be implemented as the electronic device 600 described with reference to FIG. 6 in the case of the uplink transmission or may be implemented as the electronic device 200 described with reference to FIG. 2 in the case of the downlink transmission. In FIG. 19, the control device is illustrated as an eNB 800. The eNB 800 includes one or more antennas 810 and a base station device 820. The base station device 820 and each antenna 810 may be connected with each other via a RF cable.

Each of the antennas 810 includes a single or multiple antenna elements (such as multiple antenna elements included in a Multiple Input and Multiple Output (MIMO) antenna), and is used for the base station 820 to transmit and receive radio signals. The eNB 800 may include multiple antennas 810, as illustrated in FIG. 19. For example, multiple antennas 810 may be compatible with multiple frequency bands used by the eNB 800. Although FIG. 19 illustrates the example in which the eNB 800 includes multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 can design and allocate the codebooks and/or the interleavers for individual user equipments for non-orthogonal-resource based multiple access. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data such as a terminal list, transmission power data, and scheduling data.

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface such as an Si interface and an X2 interface. The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers such as L1, medium access control (MAC), radio link control (RLC), and a packet data convergence protocol (PDCP). The BB processor 826 may have a part or all of the above-described logical functions instead of the controller 821. The BB processor 826 may be a memory that stores a communication control program, or a module that includes a processor configured to execute the program and a related circuit. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 19. For example, the multiple BB processors 826 may be compatible with multiple frequency bands used by the eNB 800. The radio communication interface 825 may include the multiple RF circuits 827, as illustrated in FIG. 19. For example, the multiple RF circuits 827 may be compatible with multiple antenna elements. Although FIG. 19 illustrates the example in which the radio communication interface 825 includes the multiple BB processors 826 and the multiple RF circuits 827, the radio communication interface 825 may also include a single BB processor 826 or a single RF circuit 827.

In the eNB 800 illustrated in FIG. 19, one or more of the components (for example, the determination unit 204 and the interleaving unit 205) included in the processing circuit 203 described with reference to FIG. 2 or one or more of the components (for example, the determination unit 604 and the detection unit 605) included in the processing circuit 603 described with reference to FIG. 6 may be implemented in the radio communication interface 825. Alternatively, at least a part of these components may be implemented in the controller 821. As an example, the eNB 800 includes a part (for example, the BB processor 826) or the entire of the radio communication interface 825 and/or a module including the controller 821, and the one or more components may be implemented in the module. In this case, the module may store a program (in other words, a program for causing the processor to execute operations of the one or more components) for causing the processor to function as the one or more components, and execute the program. As another example, a program for causing the processor to function as the one or more components may be installed in the eNB 800, and the radio communication interface 825 (for example, the BB processor 826) and/or the controller 821 may execute the program. As described above, as a device including the one or more components, the eNB 800, the base station device 820 or the module may be provided, and the program for causing the processor to function as the one or more components may be provided. In addition, a readable medium in which the program is recorded may be provided.

In addition, in the eNB 800 illustrated in FIG. 19, the communication unit 201 described with reference to FIG. 2 or the communication unit 601 described with reference to FIG. 6 may be implemented in the radio communication interface 825 (for example, the RF circuit 827). In addition, the communication unit 201 or 601 may be implemented in the controller 821 and/or the network interface 823.

Second Application Example

Figure 20:
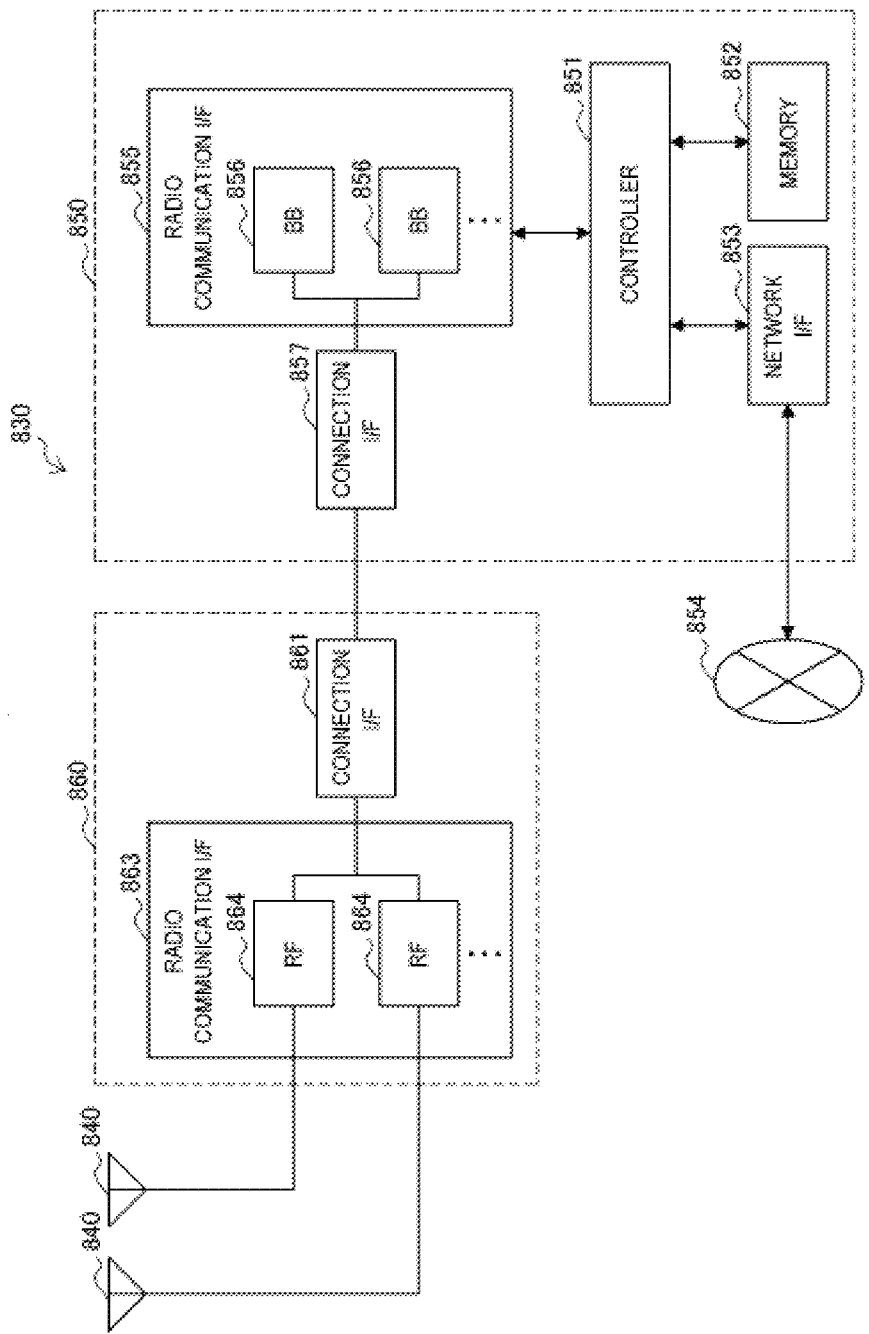
FIG. 20 is a block diagram illustrating a second example of the schematic configuration of the control device according to the embodiment of the present disclosure.

FIG. 20 is a block diagram illustrating a second example of a schematic configuration of control device to which a technology of the present disclosure may be applied. In this Figure, the control device may be implemented as the electronic device 600 described with reference to FIG. 6 in the case of the uplink transmission or may be implemented as the electronic device 200 described with reference to FIG. 2 in the case of the downlink transmission. In FIG. 20, the control device is illustrated as an eNB 830. The eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements such as multiple antenna elements included in an MIMO antenna, and is used for the RRH 860 to transmit and receive radio signals. The eNB 830 may include multiple antennas 840, as illustrated in FIG. 20. For example, multiple antennas 840 may be compatible with multiple frequency bands used by the eNB 830. Although FIG. 20 illustrates the example in which the eNB 830 includes multiple antennas 840, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 19.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 19, except the BB processor 856 is connected to the RF circuit 864 of the RRH 860 via the connection interface 857. The radio communication interface 855 may include the multiple BB processors 856, as illustrated in FIG. 20. For example, multiple BB processors 856 may be compatible with multiple frequency bands used by the eNB 830. Although FIG. 20 illustrates the example in which the radio communication interface 855 includes multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 20. For example, multiple RF circuits 864 may support multiple antenna elements.

Although FIG. 20 illustrates the example in which the radio communication interface 863 includes the multiple RF circuits 864, the radio communication interface 863 may also include a single RF circuit 864.

In the eNB 830 illustrated in FIG. 20, one or more of the components (for example, the determination unit 204 and the interleaving unit 205) included in the processing circuit 203 described with reference to FIG. 2 or one or more of the components (for example, the determination unit 604 and the detection unit 605) included in the processing circuit 603 described with reference to FIG. 6 may be implemented in the radio communication interface 855. Alternatively, at least a part of these components may be implemented in the controller 851. As an example, the eNB 830 include a part (for example, the BB processor 856) or the entire of the radio communication interface 855 and/or a module including the controller 851, and the one or more components may be implemented in the module. In this case, the module may store a program (in other words, a program for causing the processor to execute operations of the one or more components) for causing the processor to function as the one or more components, and execute the program. As another example, a program for causing the processor to function as the one or more components may be installed in the eNB 830, and the radio communication interface 855 (for example, the BB processor 856) and/or the controller 851 may execute the program. As described above, as a device including the one or more components, the eNB 830, the base station device 850 or the module may be provided, and the program for causing the processor to function as the one or more components may be provided. In addition, a readable medium in which the program is recorded may be provided.

In addition, in the eNB 830 illustrated in FIG. 20, the communication unit 201 described with reference to FIG. 2 or the communication unit 601 described with reference to FIG. 6 may be implemented in the radio communication interface 855 (for example, the BB circuit 856). In addition, the communication unit 201 or 601 may be implemented in the controller 851 and/or the network interface 853.

8-2. Applications Related to Electronic Device on the Transmitting Side

First Application Example

Figure 21:
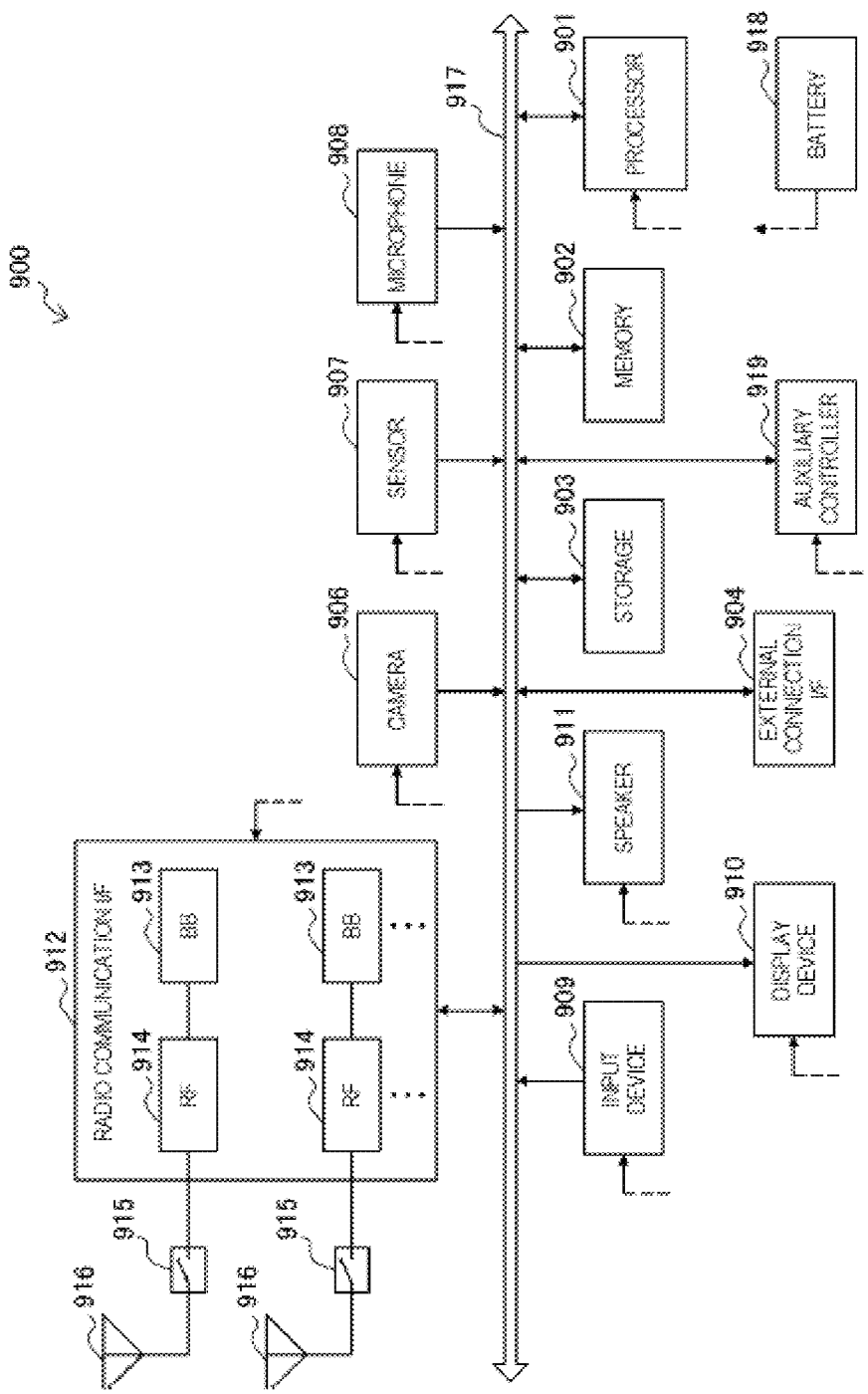
FIG. 21 is a block diagram illustrating an example of a schematic configuration of a smartphone according to the embodiment of the present disclosure.

FIG. 21 is a block diagram illustrating an example of a schematic configuration of a smartphone 900 to which a technology of the present application may be applied. In this Figure, the smartphone 900 may be implemented as the electronic device 200 described with reference to FIG. 2 in the case of the uplink transmission or may be implemented as the electronic device 600 described with reference to FIG. 6 in the case of the downlink transmission. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and the other layers of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a Charge Coupled Device (CCD) and a Complementary Metal Oxide Semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that integrates the BB processor 913 and the RF circuit 914 thereon. The radio communication interface 912 may include multiple BB processors 913 and multiple RF circuits 914, as illustrated in FIG. 21. Although FIG. 21 illustrates the example in which the radio communication interface 912 includes multiple BB processors 913 and multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-range wireless communication scheme, a near field communication scheme, and a wireless local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements such as multiple antenna elements included in an MIMO antenna, and is used for the radio communication interface 912 to transmit and receive radio signals. The smartphone 900 may include multiple antennas 916, as illustrated in FIG. 21. Although FIG. 21 illustrates the example in which the smartphone 900 includes multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 21 via feeder lines, which are partially shown as dashed lines in the figure. The auxiliary controller 919 operates a minimum necessary function of the smartphone 900, for example, in a sleep mode.

In the smartphone 900 illustrated in FIG. 21, one or more of the components (for example, the determination unit 204 and/or the interleaving unit 205) included in the processing circuit 203 described with reference to FIG. 2 or one or more of the components (for example, the determination unit 604 and the detection unit 605) included in the processing circuit 603 described with reference to FIG. 6 may be implemented in the radio communication interface 912. Alternatively, at least a part of these components may also be implemented in the processor 901 or the auxiliary controller 919. As an example, the smartphone 900 include a part (for example, the BB processor 913) or the entire of the radio communication interface 912, and/or a module including the processor 901 and/or the auxiliary controller 919, and the one or more components may be implemented in the module. In this case, the module may store a program (in other words, a program for causing the processor to execute operations of the one or more components) causing the processor to function as the one or more components, and execute the program. As another example, a program for causing the processor to function as the one or more components may be installed in the smartphone 900, and the radio communication interface 912 (for example, the BB processor 913), the processor 901 and/or the auxiliary controller 919 may execute the program. As described above, as a device including the one or more components, the smartphone 900 or the module may be provided. A program for causing the processor to function as the one or more components may also be provided. In addition, a readable medium in which the program is recorded may be provided.

In addition, in the smartphone 900 illustrated in FIG. 21, for example, the communication unit 201 described with reference to FIG. 2 or the communication unit 601 described with reference to FIG. 6 may be implemented in the radio communication interface 912, for example, the RF circuit 914.

Second Application Example

Figure 22:
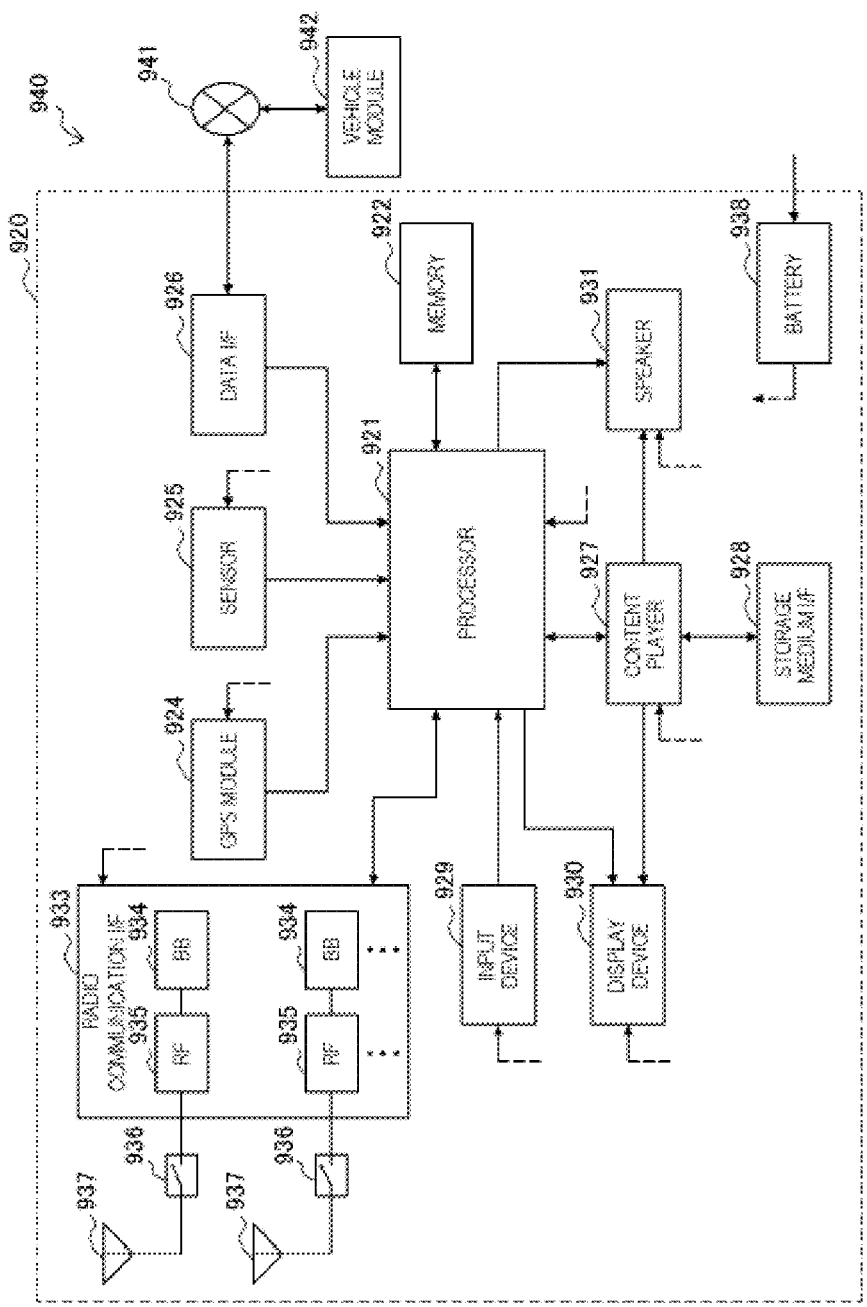
FIG. 22 is a block diagram illustrating an example of a schematic configuration of a car navigation device according to the embodiment of the present disclosure.

FIG. 22 is a block diagram illustrating an example of a schematic configuration of a car navigation device 920 to which the content of the present disclosure may be applied. In this Figure, the smartphone 900 may be implemented as the electronic device 200 described with reference to FIG. 2 in the case of the uplink transmission or may be implemented as the electronic device 600 described with reference to FIG. 6 in the case of the downlink transmission. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and other functions of the car navigation device 920. The memory 922 includes RAM and ROM, and stores a program that is executed by the processor 921, and data.

The GPS module 924 uses GPS signals received from a GPS satellite to measure a position, such as latitude, longitude, and altitude, of the car navigation device 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium, such as a CD and a DVD, that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme, such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module which integrates the BB processor 934 and the RF circuit 935 thereon. The radio communication interface 933 may include multiple BB processors 934 and multiple RF circuits 935, as illustrated in FIG. 22. Although FIG. 22 illustrates the example in which the radio communication interface 933 includes multiple BB processors 934 and multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-range wireless communication scheme, a near field communication scheme, and a wireless LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements, such as multiple antenna elements included in an MIMO antenna, and is used for the radio communication interface 933 to transmit and receive radio signals. The car navigation device 920 may include the multiple antennas 937, as illustrated in FIG. 22. Although FIG. 22 illustrates the example in which the car navigation device 920 includes multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. 22 via feeder lines that are partially shown as dashed lines in the figure. The battery 938 accumulates power supplied form the vehicle.

In the car navigation device 920 illustrated in FIG. 22, one or more of the components (for example, the determination unit 204 and/or the interleaving unit 205) included in the processing circuit 203 described with reference to FIG. 2 or one or more of the components (for example, the determination unit 604 and/or the detection unit 605) included in the processing circuit 603 described with reference to FIG. 6 may be implemented in the radio communication interface 933. Alternatively, at least a part of these components may also be implemented in the processor 921. As an example, the car navigation device 920 includes a part (for example, the BB processor 934) or the entire of the radio communication interface 933 and/or a module including the processor 921, and the one or more components may be implemented in the module. In this case, the module may store a program (in other words, a program for causing the processor to execute operations of the one or more components) causing the processor to function as the one or more components, and execute the program. As another example, a program for causing the processor to function as the one or more components may be installed in the car navigation device 920, and the radio communication interface 933 (for example, the BB processor 934) and/or the processor 921 may execute the program. As described above, as a device including the one or more components, the car navigation device 920 or the module may be provided, and a program for causing the processor to function as the one or more components may be provided. In addition, a readable medium in which the program is recorded may be provided.

In addition, in the car navigation device 920 illustrated in FIG. 22, for example, the communication unit 201 described with reference to FIG. 2 or the communication unit 601 described with reference to FIG. 6 may be implemented in the radio communication interface 933, for example, the RF circuit 935.

Technology of the content of the present application may also be implemented as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

The exemplary embodiments of the present disclosure have been described above with reference to the drawings, but the present disclosure is of course not limited thereto. A person skilled in the art can make various alternations and modifications within the scope of the appended claims, and it is understood that such alternations and modifications will of course fall within the technical scope of the present disclosure.

For example, a plurality of functions included in one module in the above embodiment may be implemented by separate devices. Alternatively, the plurality of functions implemented by the plurality of modules in the above embodiments may be implemented by separate devices, respectively. In addition, one of the above functions can be implemented by a plurality of modules. It is needless to say, such configuration is included in the technical scope of the present disclosure.

In this specification, the steps described in the flowcharts include not only processes performed in time series in the stated order, but also processes performed in parallel or individually rather than necessarily in time series. Further, even in the step of processing in time series, it is needless to say that the order can be appropriately changed.

The present disclosure and its advantages have been described in detail, and it is understood that various changes, substitutions and transformations can be made without departing from the spirit and scope of the disclosure. Furthermore, the term "comprising," "comprises," or any other variation of the embodiments of the present disclosure is intended to encompass a non-exclusive inclusion, such that a process, method, article, or device that comprises a series of elements includes not only those elements but also other elements that are not explicitly listed, or elements that are inherent to such a process, method, item, or device. An element that is defined by the phrase "comprising a . . . " does not exclude the presence of additional equivalent elements in the process, method, article, or device that comprises the element.

What is claimed is:

1. An electronic device on a transmitting side in a communication system, comprising:
    a memory configured to store a computer program; and
    processing circuitry that in response to executing the computer program stored in the memory is configured to operate the electronic device
    determine information on a codebook to perform non-orthogonal-resource based multiple access over a set of transmission resources, and
    interleave occupied elements of at least two codewords of one user equipment among a plurality of user equipments on the set of transmission resources according to the information on the codebook.

2. The electronic device according to claim 1, wherein the processing circuitry is further configured to interleave the occupied elements in individual dimensions between the at least two codewords.

3. The electronic device according to claim 1, wherein the processing circuitry is further configured to interleave the occupied elements in a same dimension of the at least two codewords.

4. The electronic device according to claim 2, wherein the processing circuitry is further configured to perform random interleaving or non-overlapping interleaving.

5. The electronic device according to claim 1, wherein the processing circuitry is further configured such that the information on the codebook includes information on resource allocation and information on constellation, and wherein the information on constellation includes information on mother constellation and information on operation, and wherein the information on operation includes at least one of information on phase rotation, information on dimension permutation, and information on constellation conjugation of the mother constellation.

6. The electronic device according to claim 5, wherein the processing circuitry is further configured to interleave the occupied elements on individual dimensions of at least two constellation-modulated symbols of each user equipment and expand the interleaved symbols into respective codewords.

7. The electronic device according to claim 6, wherein information on operation includes at least one of information on phase rotation, information on dimension permutation, and information on constellation conjugation of the mother constellation.

8. The electronic device according to claim 1, wherein the processing circuitry is further configured to cache the at least two codewords prior to interleaving, or
  determine the number of different codewords to be interleaved based on the correlation and a time delay.

9. The electronic device according to claim 8, wherein the processing circuitry is further configured to implement an interleaver based on information on interleaver configuration that includes an identification number of the interleaver, and wherein the information on interleaver configuration further includes an interleaving criterion and a category of the interleaver.

10. The electronic device according to claim 1, wherein the non-orthogonal-resource is implemented as a sparse code multiple access (SCMA), and the information on the codebook includes information associated with a mapping matrix for SCMA indicates resources in the set of transmission resources occupied by the plurality of user equipments, or
  the non-orthogonal-resource based multiple is implemented as a pattern division multiple access (PDMA), and the information on codebook includes information associated with a pattern matrix for PDMA to indicate resources of the set of transmission resources occupied by the plurality of user equipments.

11. An electronic device on a receiving side in a communication system, comprising:
  a memory configured to store a computer program; and
  processing circuitry that in response to executing the computer program stored in the memory is configured to operate the electronic device
  determine information on a codebook and information on interleaving configuration for non-orthogonal-resource based multiple access for a plurality of user equipments, and
  detect received signals according to the information on the codebook and the information on interleaving configuration to obtain data of respective user equipment.

12. The electronic device according to claim 11, wherein the processing circuitry is further configured to jointly detect signals received on a plurality of time domain units based on the information on codebook and the information on interleaving configuration.

13. The electronic device according to claim 11, wherein the processing circuitry is further configured to generate an expanded codebook based on the information on codebook and the information on interleaving configuration, and to jointly detect signals received on a plurality of time domain units by utilizing the expanded codebook.

14. A communication method, wherein it comprises:
  determining information on a codebook to perform non-orthogonal-resource based multiple access over a set of transmission resources, and
  interleaving occupied elements of at least two codewords of one user equipment among a plurality of user equipments on the set of transmission resources according to the information on the codebook.

15. The communication method according to claim 14, wherein, further comprising:
  interleaving the occupied elements in individual dimensions between the at least two codewords.

16. The communication method according to claim 14, wherein, further comprising:
  interleaving the occupied elements in a same dimension of the at least two codewords.

17. The communication method according to claim 15, wherein, further comprising:
  performing random interleaving or non-overlapping interleaving.

18. The communication method according to claim 14, wherein the information on the codebook includes information on resource allocation and information on constellation, and wherein the information on constellation includes information on mother constellation and information on operation, and wherein the information on operation includes at least one of information on phase rotation, information on dimension permutation, and information on constellation conjugation of the mother constellation.

19. The communication method according to claim 14, wherein, further comprising:
  interleaving the occupied elements on individual dimensions of at least two constellation-modulated symbols of each user equipment and
  expanding the interleaved symbols into respective codewords.

20. The communication method according to claim 19, wherein the information on operation includes at least one of information on phase rotation, information on dimension permutation, and information on constellation conjugation of the mother constellation.

* * * * *